US010755574B2

(12) United States Patent
Park et al.

(10) Patent No.: US 10,755,574 B2
(45) Date of Patent: Aug. 25, 2020

(54) COMMUNICATION APPARATUS FOR VEHICLE AND VEHICLE

(71) Applicant: LG Electronics Inc., Seoul (KR)

(72) Inventors: Suho Park, Seoul (KR); Jaeseung Bae, Seoul (KR); Hansung Kim, Seoul (KR); Jaehwan Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/463,226

(22) PCT Filed: May 8, 2017

(86) PCT No.: PCT/KR2017/004765
§ 371 (c)(1),
(2) Date: May 22, 2019

(87) PCT Pub. No.: WO2018/097424
PCT Pub. Date: May 31, 2018

(65) Prior Publication Data
US 2020/0074861 A1 Mar. 5, 2020

(30) Foreign Application Priority Data

Nov. 22, 2016 (KR) .................... 10-2016-0155953

(51) Int. Cl.
*G08G 1/16* (2006.01)
*H04W 4/46* (2018.01)

(52) U.S. Cl.
CPC ............. *G08G 1/161* (2013.01); *G08G 1/166* (2013.01); *H04W 4/46* (2018.02)

(58) Field of Classification Search
CPC .......... G08G 1/017; G08G 1/09; G08G 1/161; G08G 1/166; H04W 4/46; H04W 4/04; H04W 4/046
See application file for complete search history.

(56) References Cited

U.S. PATENT DOCUMENTS

| | | | |
|---|---|---|---|
| 2012/0083960 A1* | 4/2012 | Zhu ...................... | B60T 17/221 701/23 |
| 2015/0241880 A1* | 8/2015 | Kim .................. | G08G 1/096725 701/25 |
| 2017/0178498 A1* | 6/2017 | Mcerlean ............... | B60K 35/00 |
| 2018/0184245 A1* | 6/2018 | Park ...................... | H04W 4/023 |

* cited by examiner

*Primary Examiner* — Omeed Alizada
(74) *Attorney, Agent, or Firm* — Fish & Richardson P.C.

(57) ABSTRACT

Disclosed is a communication apparatus for a vehicle, including: an interface unit configured to receive sensing information regarding a first other vehicle located in a vicinity of the vehicle and incapable of performing vehicle-to-vehicle communication; a transmitter configured to transmit information to a second other vehicle capable of performing vehicle-to-vehicle communication; and a processor configured to generate recognition information for the first other vehicle based on the sensing information, and transmit the recognition information for the first other vehicle to the second other vehicle through the transmitter.

18 Claims, 38 Drawing Sheets

COMMUNICATION APPARATUS FOR VEHICLE AND VEHICLE

CROSS-REFERENCE TO RELATED APPLICATIONS

This application is a National Stage application under 35 U.S.C. § 371 of International Application No. PCT/KR2017/004765, filed on May 8, 2017, which claims the benefit of Korean Application No. 10-2016-0155953, filed on Nov. 22, 2016. The disclosures of the prior applications are incorporated by reference in their entirety.

TECHNICAL FIELD

The present invention relates to a communication apparatus and a vehicle.

BACKGROUND ART

A vehicle is an apparatus that moves in a direction desired by a user riding therein. A representative example of a vehicle is an automobile.

A variety of sensors and electronic devices are mounted in vehicles for convenience of a user who uses the vehicle. In particular, for driving convenience, an Advanced Driver Assistance System (ADAS) has been actively studied. In addition, enormous efforts have been being made to develop autonomous vehicles.

With development of technologies, vehicle-to-vehicle (V2V) communication technologies and vehicle-to-infrastructure (V2I) communication technologies have been developed as well.

When a plurality of vehicles is travelling, the vehicles may exchange information on their presence, locations, and the like with each other through the V2V communication. Such V2V communication and V2I communication may be referred to as V2X communication.

However, when a vehicle capable of performing V2X communication and a vehicle incapable of performing V2X communication are present together, it is not possible to obtain information on the vehicle incapable of performing V2X communication.

In this case, the vehicle incapable of performing V2X communication may be classified as a risk factor due to insufficient information and regarded as an obstacle for V2X communication-based autonomous driving.

DISCLOSURE

Technical Problem

The present invention has been made in view of the above problems, and it is one object of the present invention to provide a communication apparatus that transmits recognition information for a vehicle incapable of performing vehicle-to-everything (V2X) communication.

It is another object of the present invention to provide a vehicle that receives recognition information for a vehicle incapable of performing V2X communication and displays the recognition information.

Objects of the present invention should not be limited to the aforementioned objects and other unmentioned objects will be clearly understood by those skilled in the art from the following description.

Technical Solution

In accordance with an embodiment of the present invention, the above and other objects can be accomplished by the provision of a communication apparatus for a vehicle, comprising:

an interface unit configured to receive sensing information regarding a first other vehicle located in a vicinity of the vehicle and incapable of performing vehicle-to-vehicle communication; a transmitter configured to transmit information to a second other vehicle capable of performing vehicle-to-vehicle communication; and a processor configured to generate recognition information for the first other vehicle based on the sensing information, and transmit the recognition information for the first other vehicle to the second other vehicle through the transmitter.

In accordance with an embodiment of the present invention, the above and other objects can be accomplished by the provision of a vehicle including: a communication apparatus, wherein the communication apparatus comprises a receiver configured to receive information from a plurality of other vehicles, and a processor configured to receive, through the receiver, recognition information for a first other vehicle incapable of performing vehicle-to-vehicle communication; and a user interface apparatus configured to, based on the recognition information for the first other vehicle, output a graphic image corresponding to the first other vehicle.

The details of other embodiments are included in the following description and the accompanying drawings.

Advantageous Effects

According to embodiments of the present invention, there are advantageous effects as follows.

First, vehicles capable of performing vehicle-to-vehicle (V2V) communication are able to share information on a vehicle incapable of performing V2V communication.

Second, by acquiring presence information, location information, speed information, and the like regarding the vehicle incapable of performing V2V communication, it is possible to predict movement of the vehicle incapable of performing V2V communication.

Third, it is possible to drive safely based on information on the vehicle incapable of performing V2V communication.

Effects of the present invention are not limited to those described above and other effects of the present invention will be apparent to those skilled in the art from the following descriptions. The scope of the claims is not limited to the aforementioned effects.

BEST MODE

Figure 1:
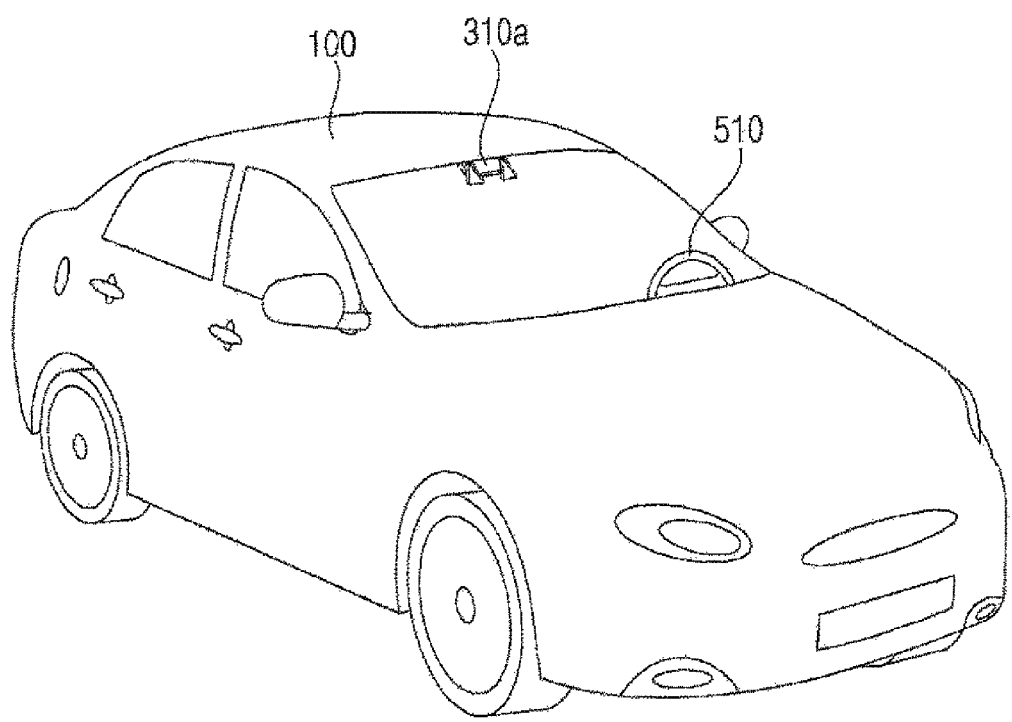
FIG. 1 is a view of the external appearance of a vehicle according to an embodiment of the present invention.
Figure 1:
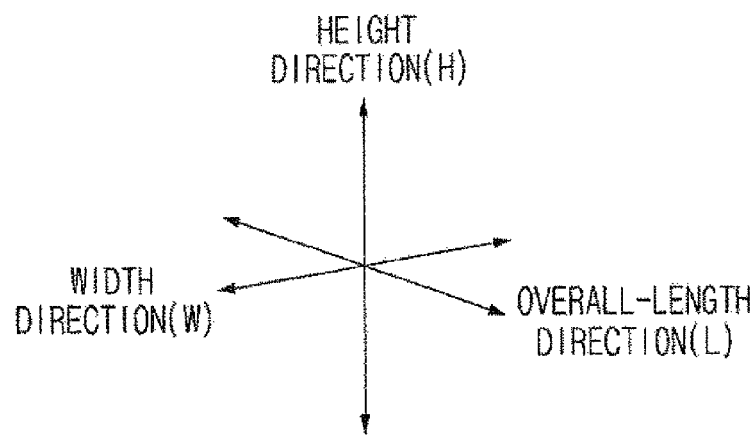

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present invention.

Figure 2:
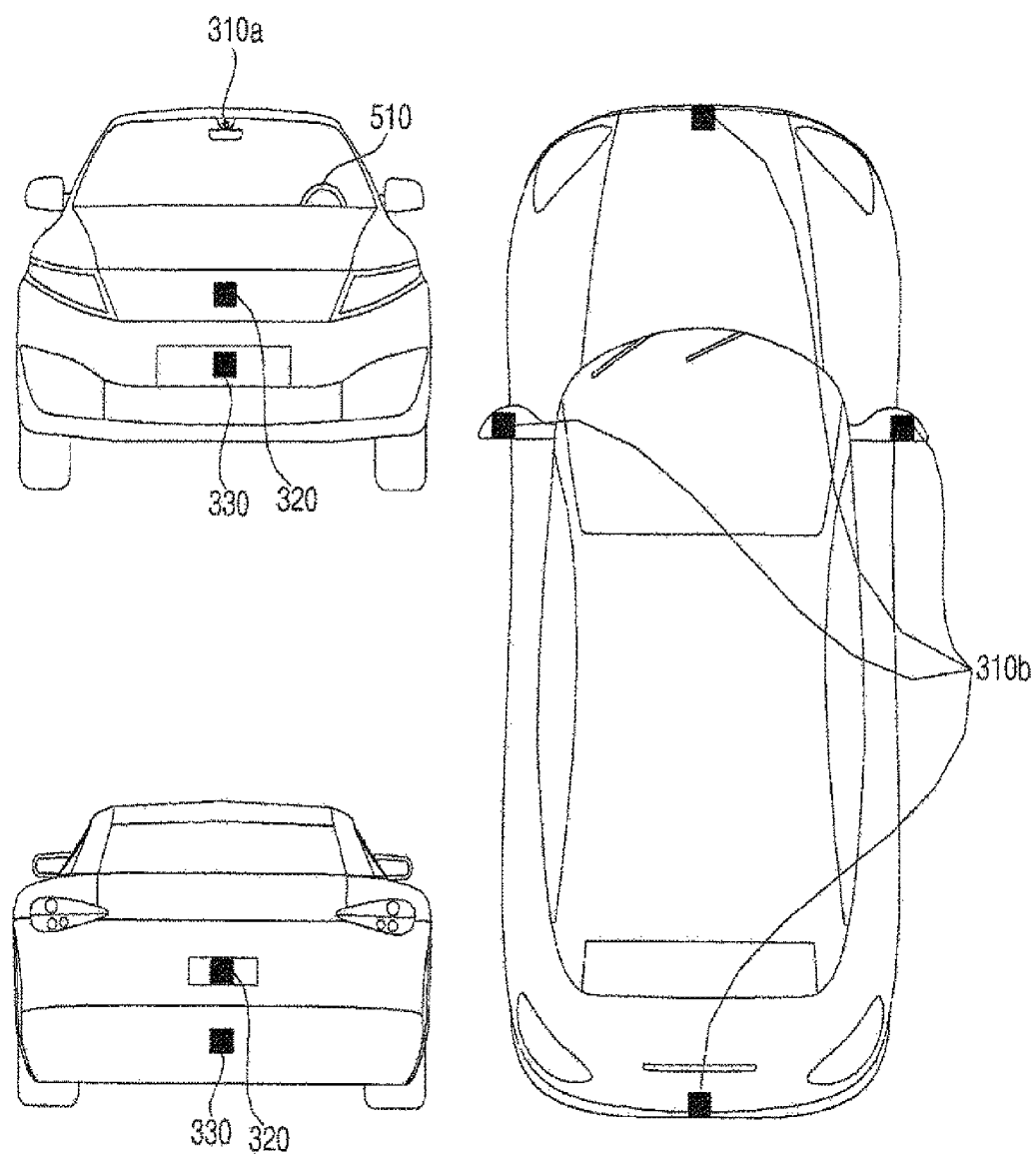
FIG. 2 is different angled views of a vehicle according to an embodiment of the present invention.

FIG. 2 is different angled views of a vehicle according to an embodiment of the present invention.

Figure 3:
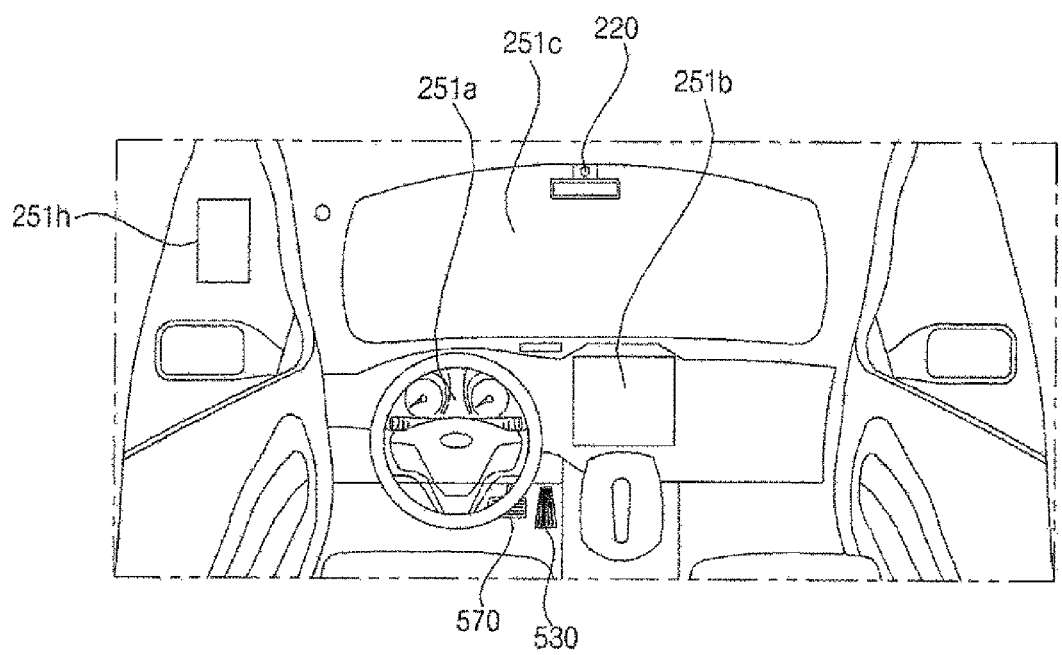
FIGS. 3 and 4 are views of the internal configuration of a vehicle according to an embodiment of the present invention.
Figure 4:
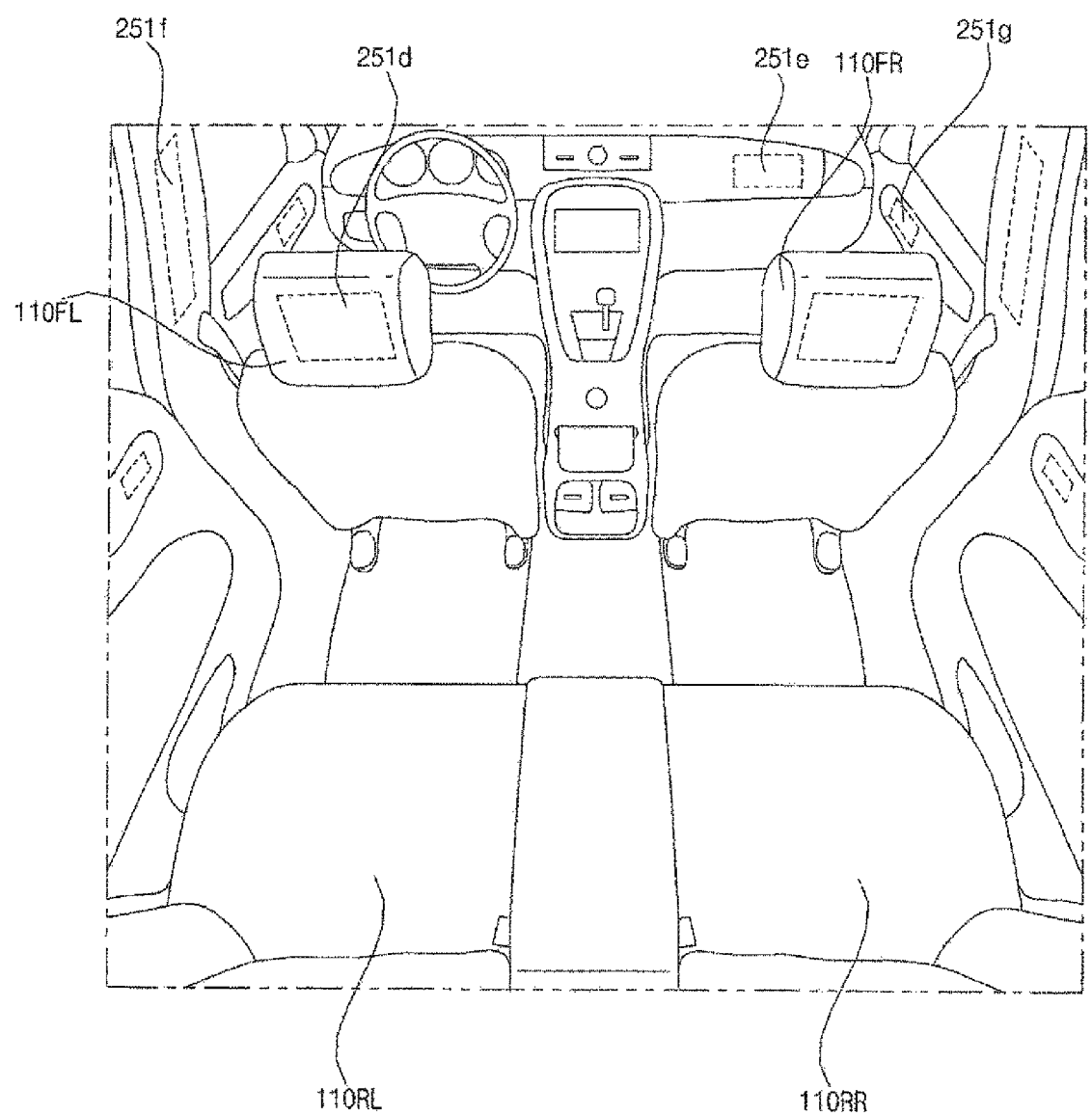

FIGS. 3 and 4 are views of the internal configuration of a vehicle according to an embodiment of the present invention.

Figure 5:
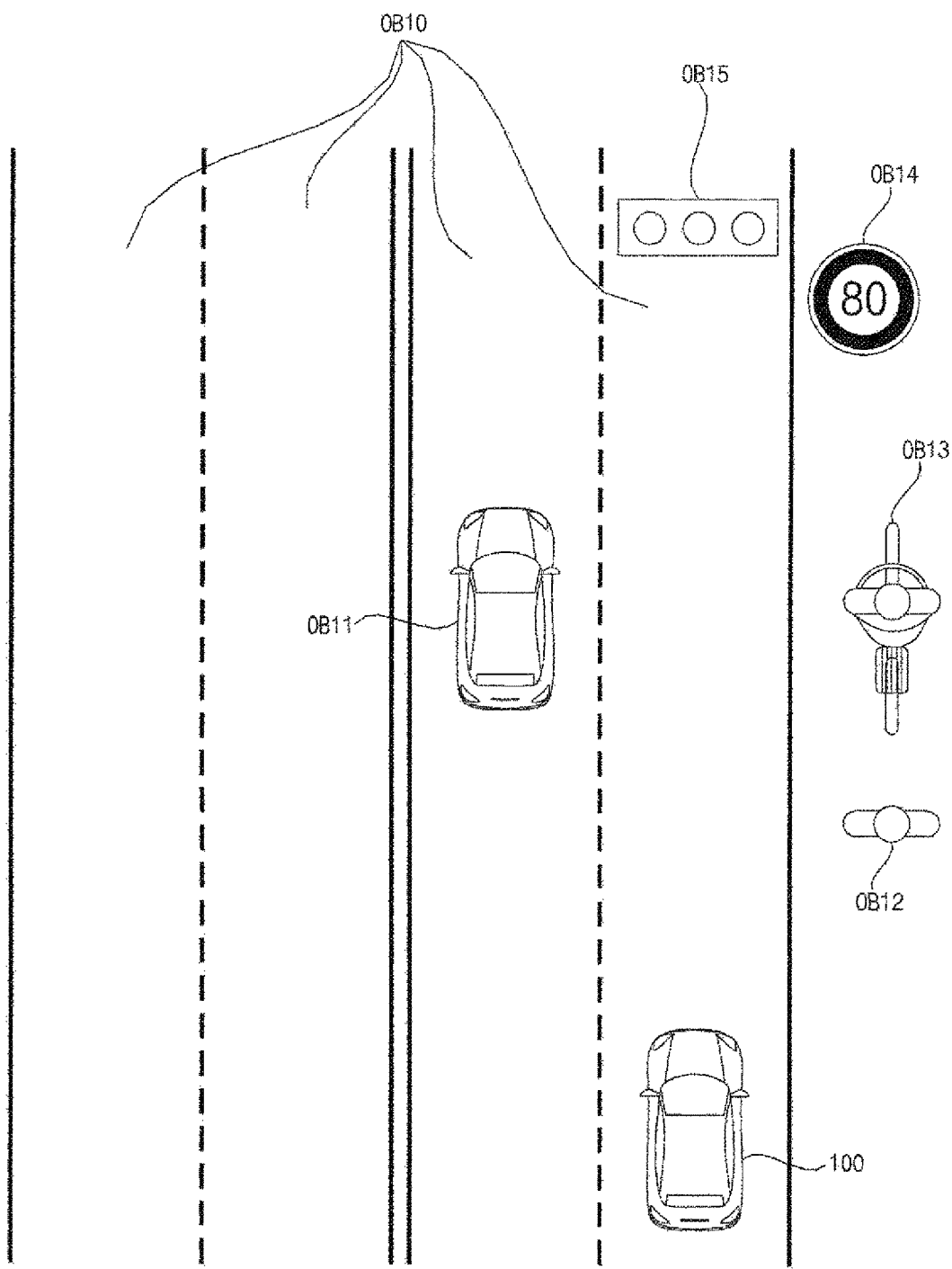
FIGS. 5 and 6 are views for explanation of objects according to an embodiment of the present invention.
Figure 6:
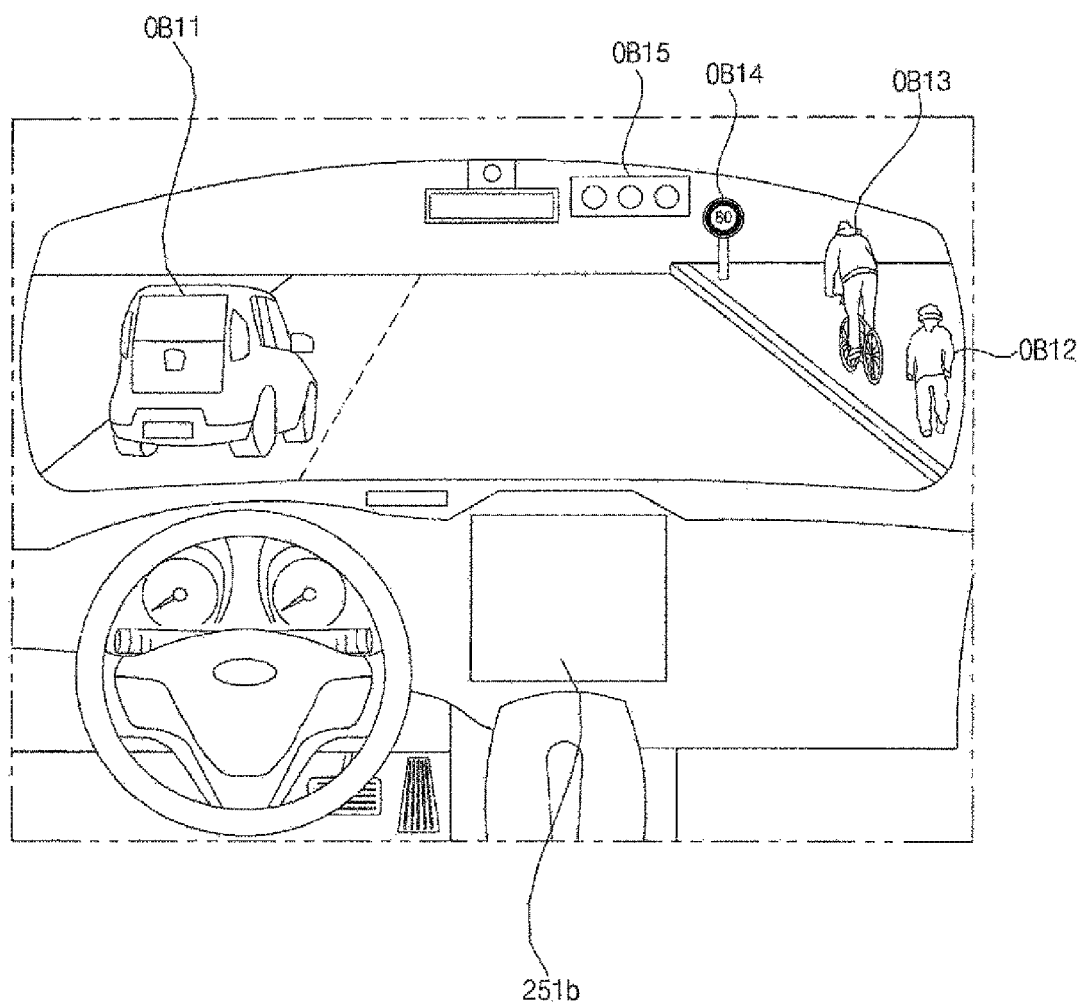

FIGS. 5 and 6 are views for explanation of objects according to an embodiment of the present invention.

Figure 7:
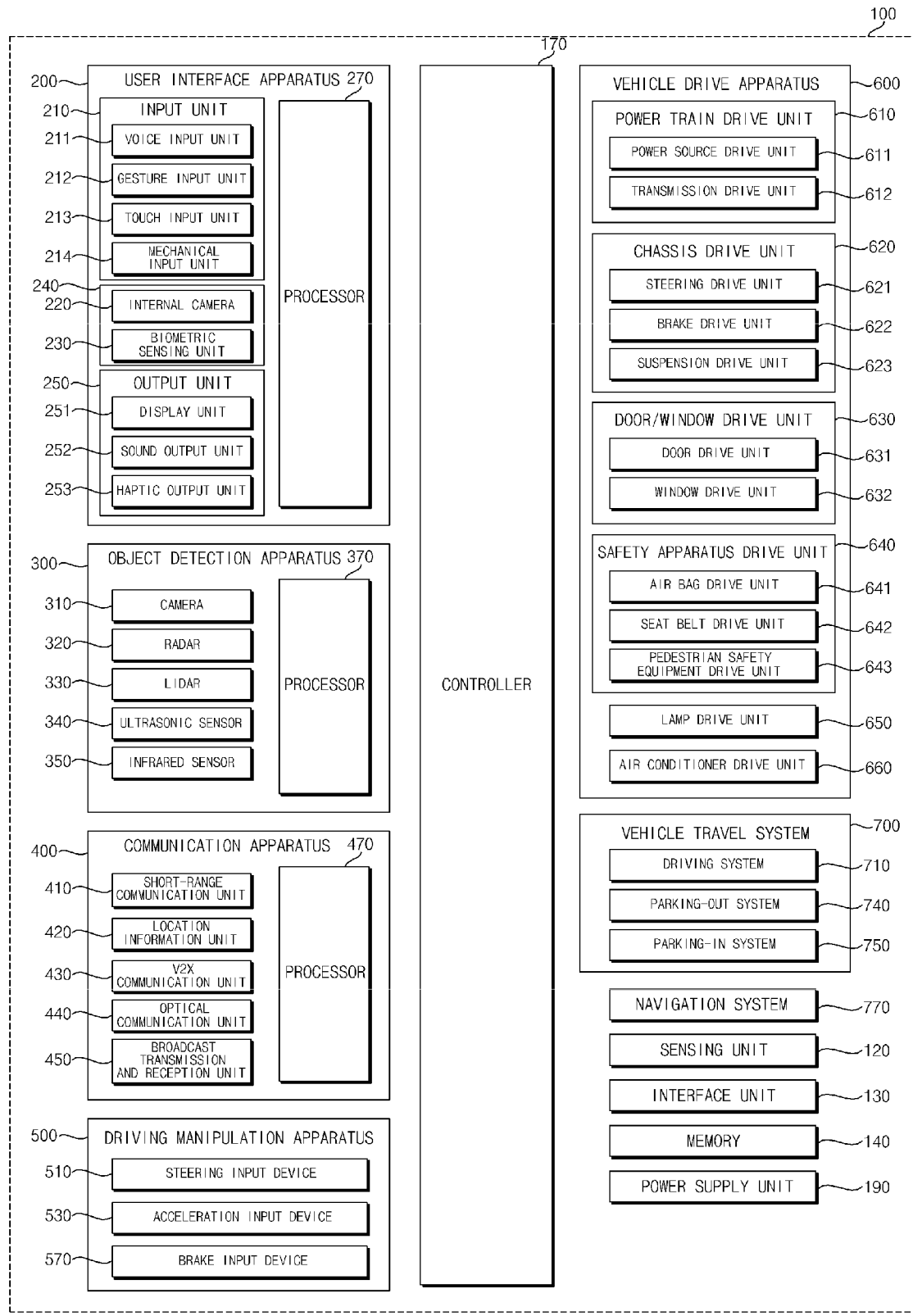
FIG. 7 is a block diagram referred to in the description of a vehicle according to an embodiment of the present invention.

FIG. 7 is a block diagram referred to in the description of a vehicle according to an embodiment of the present invention.

Referring to FIGS. 1 to 7, a vehicle 100 may include a wheel rotating by a power source, and a steering input device 510 for controlling a driving direction of the vehicle 100.

The vehicle 100 may be an autonomous vehicle.

The vehicle 100 may be switched to an autonomous driving mode or a manual mode in response to a user input.

For example, in response to a user input received through the user interface device 200, the vehicle 100 may be switched from a manual mode to an autonomous driving mode, or vice versa.

The vehicle 100 may be switched to an autonomous mode or a manual mode based on driving situation information.

The driving situation information may include at least one of information on an object outside a vehicle, navigation information, and vehicle state information.

For example, the vehicle 100 may be switched from the manual mode to the autonomous driving mode, or vice versa, based on driving situation information generated in the object detection apparatus 300.

In another example, the vehicle 100 may be switched from the manual mode to the autonomous driving mode, or vice versa, based on driving situation information received through a communication apparatus 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on a vehicle travel system 700.

For example, the autonomous vehicle 100 may operate based on information, data, or signals generated in a driving system 710, a parking-out system 740, and a parking-in system 750.

In the manual mode, the autonomous vehicle 100 may receive a user input for driving the vehicle 100 through a driving manipulation device 500. The vehicle 100 may operate based on the user input received through the driving manipulation device 500.

The term "overall length" means the length from the front end to the rear end of the vehicle 100, the term "width" means the width of the vehicle 100, and the term "height" means the height from the bottom of the wheel to the roof. In the following description, the term "overall length direction L" may mean the reference direction for the measurement of the overall length of the vehicle 100, the term "width direction W" may mean the reference direction for the measurement of the width of the vehicle 100, and the term "height direction H" may mean the reference direction for the measurement of the height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and a processor 270.

In some embodiments, the user interface apparatus 200 may further include other components in addition to the aforementioned components, or may not include some of the aforementioned components.

The input unit 210 is configured to receive information from a user, and data collected in the input unit 210 may be analyzed by the processor 270 and processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 213 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle. The processor 270 may sense a user state based on the images of the inside of the vehicle. The processor 270 may acquire information about a user's gaze from an image of the inside of the vehicle. The processor 270 may detect a user's gesture from an image of the inside of the vehicle.

The biometric sensing unit 230 may acquire biometric information of the user. The biometric sensing unit 230 may include a sensor for acquire biometric information of the user, and may utilize the sensor to acquire a user's finger print information, heart rate information, etc. The biometric information may be used to authenticate a user's identity.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface apparatus 200 may include a plurality of display units 251a to 251g.

The display unit 251 may be disposed in a region of a steering wheel, a region 521a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some embodiments, the user interface apparatus 200 may include a plurality of processors 270 or may not include any processor 270.

In the case where the user interface apparatus 200 does not include any processor 270, the user interface apparatus 200 may operate under control of the controller 170 or a processor of a different device inside the vehicle 100.

Meanwhile, the user interface apparatus 200 may be referred to as a display device for vehicle.

The user interface apparatus 200 may operate under the control of the controller 170.

The object detection apparatus 300 is used to detect an object located outside the vehicle 100.

The object detection apparatus 300 may generate object information based on sensing data.

The object information may include information about the presence of an object, information about a location of the object, information about a distance between the vehicle 100 and the object, and information about a speed of the vehicle 100 relative to the object.

The object may include various objects related to travelling of the vehicle 100.

Referring to FIGS. 5 and 6, an object O may include a lane OB10, other vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle is traveling, a lane next to the lane in which the vehicle is travelling, or a lane in which the other vehicle is travelling in the opposite direction. The lane OB10 may include left and right lines that define the lane.

The other vehicle OB11 may be a vehicle travelling in the vicinity of the vehicle 100. The other vehicle OB11 may be a vehicle within a predetermined distance from the vehicle 100. For example, the other vehicle OB11 may be a vehicle that is preceding or following the vehicle 100.

The pedestrian OB12 may be a person located in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB12 is a vehicle located in the vicinity of the vehicle 100 and moves with two wheels. The two-wheeled vehicle OB12 may be a vehicle that has two wheels within a predetermined distance from the vehicle 100. For example, the two-wheeled vehicle OB13 may be a motorcycle or a bike on a sidewalk or the roadway.

The traffic signal may include a traffic lamp OB15, a roadside sign OB14, and a pattern or text painted on a road surface.

The light may be light generated by a lamp provided in other vehicle. The light may be light generated by a street light. The light may be solar light.

The road may include a road surface, a curve, and slopes, such as an upward slope and a downward slope.

The structure may be an object located in the vicinity of a road and fixed onto the ground. For example, the structure may include a streetlight, a roadside tree, a building, a traffic light lamp, and a bridge.

The geographical feature may include a mountain and a hill.

The object may be classified as a moving object or a fixed object. For example, the moving object may be a concept including other vehicle and a pedestrian. For example, the fixed object may be a concept including a traffic signal, a roadway, and a structure.

The object detection apparatus 300 may include a camera 310, a radar 320, a lidar 330, an ultrasonic sensor 340, an infrared sensor 350, and a processor 370.

In some embodiments, the object detection apparatus 300 may further include other components in addition to the aforementioned components, or may not include some of the aforementioned components.

The camera 310 may be located at an appropriate position outside the vehicle in order to acquire images of the outside of the vehicle. The camera 310 may be a mono camera, a stereo camera 310a, an Around View Monitoring (AVM) camera 310b, or a 360-degree camera.

Using various image processing algorithms, the camera 310 may acquire information on a location of an object, information on a distance to the object, and information on a speed relative to the object.

For example, the camera 310 may acquire the information on the distance to the object and the information on the speed relative to the object, based on a change in size of the object over time in acquired images.

For example, the camera 310 may acquire the information on the distance to the object and the information on the speed relative to the object through a pin hole model or through profiling a road surface.

In another example, the camera 310 may acquire the information on the distance to the object and the information on the speed relative to the object, based on information on disparity between stereo images acquired by the stereo camera 310*a*.

For example, the camera 310 may be disposed near a front windshield in the vehicle in order to acquire images of the front of the vehicle. Alternatively, the camera 310 may be disposed in the vicinity of a front bumper or a radiator grill.

For example, the camera 310 may be disposed near a rear glass in the vehicle in order to acquire images of the rear of the vehicle. Alternatively, the camera 310 may be disposed in the vicinity of a rear bumper, a trunk, or a tailgate.

For example, the camera 310 may be disposed near at least one of the side windows in the vehicle in order to acquire images of the side of the vehicle. Alternatively, the camera 310 may be disposed in the vicinity of a side mirror, a fender, or a door.

The camera 310 may provide an acquired image to the processor 270.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle in order to sense an object located in front of the vehicle, an object located to the rear of the vehicle, or an object located to the side of the vehicle.

The lidar 330 may include a laser transmission unit and a laser reception unit. The lidar 330 may be implemented by the TOF scheme or the phase-shift scheme.

The lidar 330 may be implemented as a drive-type lidar or a non-drive type lidar.

When implemented as the drive-type lidar, the lidar 330 may rotate by a motor and detect an object in the vicinity of the vehicle 100.

When implemented as the non-drive type lidar, the lidar 330 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle in order to sense an object located in front of the vehicle, an object located to the rear of the vehicle, or an object located to the side of the vehicle.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle in order to detect an object located in front of the vehicle, an object located to the rear of the vehicle, and an object located to the side of the vehicle.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle in order to sense an object located in front of the vehicle, an object located to the rear of the vehicle, or an object located to the side of the vehicle.

The processor 370 may control the overall operation of each unit of the object detection apparatus 300.

The processor 370 may detect or classify an object by comparing sensing data with pre-stored data, the sensing data which is sensed by the camera 310, the radar 320, the lidar 330, the ultrasonic sensor 340, and the infrared sensor 350.

The processor 370 may detect an object and track the detected object based on acquired images. The processor 370 may, for example, calculate the distance to the object and the speed relative to the object.

For example, based on change in size over time of a object in acquired images, the processor 370 may acquire information on distance to the object and information on speed relative to the object.

For example, the processor 370 may acquire information on distance to an object and information on speed relative to the object, by utilizing a pin hole model or by profiling a road surface.

For example, based on information on disparity of stereo images acquired by a stereo camera 310*a*, the camera 310 may acquire the information on distance to an object and information on speed relative to the object.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some embodiments, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 is not included in the processor 370, the object detection apparatus 300 may operate under the control of the controller 170 or a processor inside the vehicle 100.

The object detection apparatus 400 may operate under the control of the controller 170.

The communication apparatus 400 is configured to perform communication with an external device. The external device may be other vehicle or a server.

To perform communication, the communication apparatus 400 may include at least one selected from a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some embodiments, the communication apparatus 400 may include a plurality of processors 470, or may not include any processor 470.

In the case where the communication apparatus 400 does not include the processor 470, the communication apparatus 400 may operate under control of the controller 170 or a processor of a device inside of the vehicle 100.

Meanwhile, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under the control of the controller 170.

The driving manipulation apparatus 500 is configured to receive a user input for driving the vehicle.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the driving direction of the vehicle 100. The steering input device 510 may take the form of a wheel to enable a steering input through the rotation thereof. In some embodiments, the steering input device may be configured as a touchscreen, a touch pad, or a button.

The acceleration input device 530 may receive a user input for acceleration of the vehicle 100.

The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive apparatus 600 may further include other components in addition to the aforementioned components, or may not include some of the aforementioned components.

Meanwhile, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 610 may perform electronic control of the engine. The output torque of the engine may be controlled according thereto. The power source drive unit 611 may adjust the output toque of the engine under control of the controller 170.

In the case where an electric motor is the power source, the power source drive unit 610 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle is high, an air conditioner drive unit 660 may operate the air conditioner so as to supply cool air to the inside of the vehicle.

The vehicle drive apparatus 600 may include a processor. Each unit of the vehicle dive device 600 may include its own processor.

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking-in system 750.

In some embodiments, the vehicle travel system 700 may further include other components in addition to the aforementioned components, or may not include some of the aforementioned component.

Meanwhile, the vehicle travel system 700 may include a processor. Each unit of the vehicle travel system 700 may include its own processor.

Meanwhile, in some embodiments, in the case where the vehicle travel system 700 is implemented as software, the vehicle travel system 700 may be a subordinate concept of the controller 170.

Meanwhile, in some embodiments, the vehicle travel system 700 may be a concept including at least one selected from among the user interface apparatus 200, the object detection apparatus 300, the communication apparatus 400, the driving manipulation apparatus 500, the vehicle drive apparatus 600, the navigation system 770, the sensing unit 120, and the controller 170.

The driving system 710 may control driving of the vehicle 100.

The driving system 710 may receive navigation information from the navigation system 700 and provide a control signal to the vehicle drive apparatus 600 so as to control driving of the vehicle 100.

The driving system 710 may receive object information from the object detection apparatus 300 and provide a control signal to the vehicle drive apparatus 600 to thereby control driving of the vehicle 100.

The driving system 710 may receive a signal from an external device through the communication apparatus 400 and provide a control signal to the vehicle drive apparatus 600 so as to control driving of the vehicle 100.

The driving system 710 may be a system that performs driving of the vehicle 100 with including at least one of the user interface apparatus 200, the object detection apparatus 300, the communication apparatus 400, the driving manipulation apparatus 500, the vehicle drive apparatus 600, the navigation system 770, the sensing unit 120, or the controller 170.

The driving system 710 may be referred to as a vehicle driving control apparatus.

The parking-out system 740 may control exiting of the vehicle 100 from a parking space.

The parking-out system 740 may receive navigation information from the navigation system 770 and provide a control signal to the vehicle drive apparatus 600 so as to control exiting of the vehicle 100 from a parking space.

The parking-out system 740 may receive object information from the object detection apparatus 300 and provide a control signal to the vehicle drive apparatus 600 so as to control exiting of the vehicle 100 from a parking space.

For example, the parking-out system 740 may receive a signal from an external device through the communication apparatus 400 and provide a control signal to the vehicle drive apparatus 600 so as to control exiting of the vehicle 100 from a parking space.

The parking-out system 740 may be a system that performs exiting of the vehicle 100 from a parking space with including at least one of the user interface apparatus 200, the object detection apparatus 300, the communication apparatus 400, the driving manipulation apparatus 500, the vehicle drive apparatus 600, the navigation system 770, the sensing unit 120, or the controller 170.

The parking-out system 740 may be referred to as a vehicle parking-out control apparatus.

The parking-in system 750 may control parking of the vehicle 100.

The parking-in system 750 may receive navigation information from the navigation system 770 and provide a control signal to the vehicle drive apparatus 600 so as to control parking of the vehicle 100.

The parking-in system 750 may receives object information from the object detection apparatus 300 and provide a control signal to the vehicle drive apparatus 600 so as to control parking of the vehicle 100.

The parking-in system 750 may receive a signal from an external device through the communication apparatus 400 and provide a control signal to the vehicle drive apparatus 600 so as to control parking of the vehicle 100.

The parking-in system 750 may be a system that performs driving of the vehicle 100 with including at least one of the user interface apparatus 200, the object detection apparatus 300, the communication apparatus 400, the driving manipulation apparatus 500, the vehicle drive apparatus 600, the navigation system 770, the sensing unit 120, or the controller 170.

The parking-in system 750 may be referred to as a vehicle parking-in control apparatus.

The parking-in system 9750 may be referred to as a vehicle parking-in control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication apparatus 400.

In some embodiments, the navigation system 770 may be classified as a subordinate element of the user interface apparatus 200.

The sensing unit 120 may sense the state of the vehicle. The sensing unit 120 may include an attitude sensor (i.e., a yaw sensor, a roll sensor, and a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal through the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an sub-element of the controller 170.

The controller 170 may control the overall operation of each unit inside the vehicle 100

The controller 170 may be referred to as an Electronic Control Unit (ECU).

The power supply unit 190 may supply power required to operate each component under control of the controller 170. In particular, the power supply unit 190 may receive power from, for example, a battery inside the vehicle.

One or more processors and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
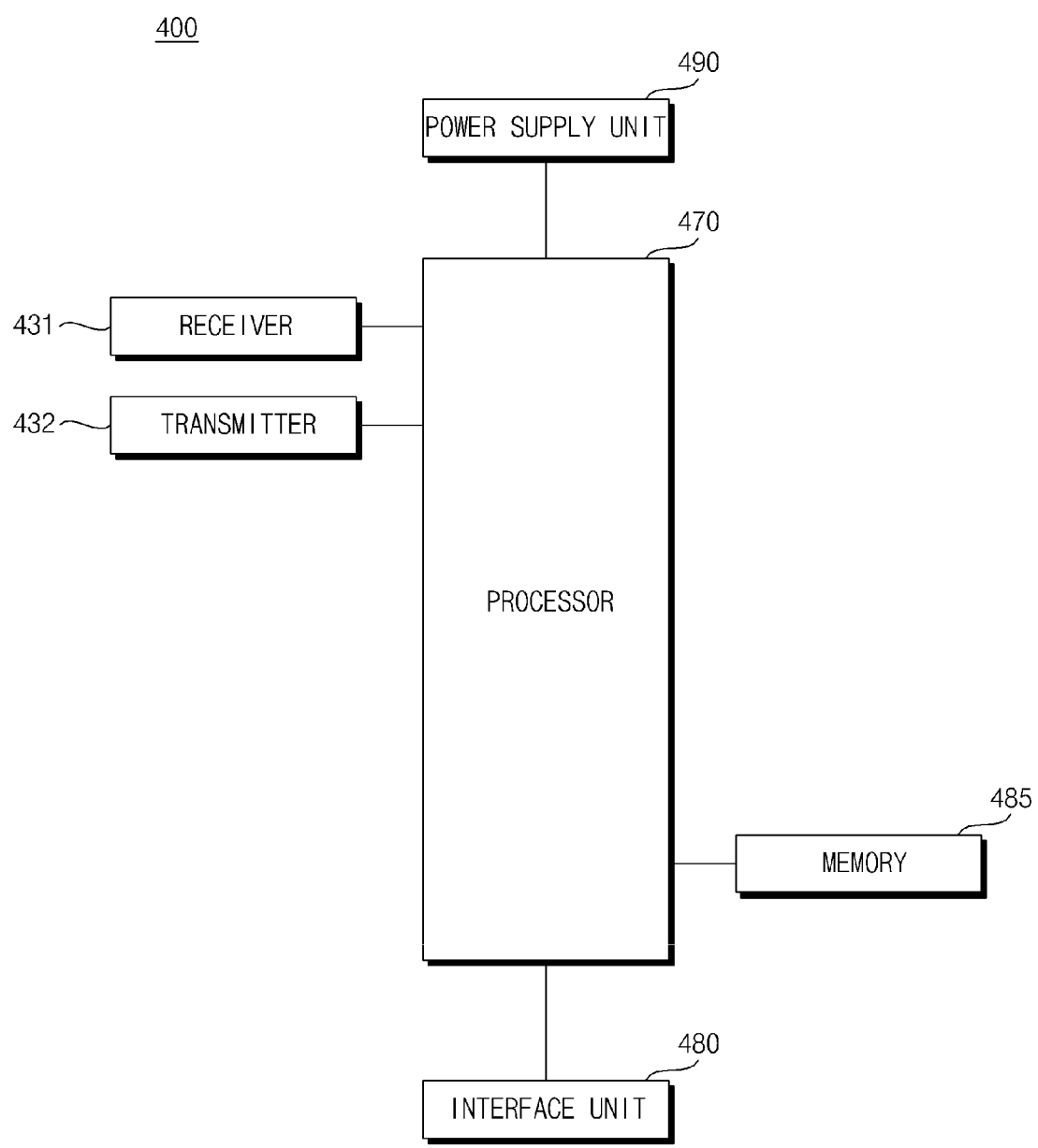
FIG. 8 is a block diagram referred to in the description of a communication apparatus according to an embodiment of the present invention.

FIG. 8 is a block diagram referred to in the description of a communication apparatus according to an embodiment of the present invention.

A vehicle 100 is a vehicle capable of performing vehicle-to-vehicle communication (V2V communication or V2X communication).

A communication apparatus 400 for a vehicle may be referred to as a V2X communication apparatus.

The communication apparatus 400 may include a receiver 431, a transmitter 432, a processor 470, an interface unit 480, a memory 485, and a power supply unit 490.

The receiver 431 and the transmitter 432 may be included in a V2X communication unit 430.

The receiver 431 may receive information, data, or a signal from other vehicle or infrastructure. The receiver 431 may include a radio frequency (RF) circuit including a receiver antenna.

The receiver 431 may receive recognition information for a plurality of other vehicles.

The receiver 431 may operate under control of the processor 470.

The transmitter 432 may transmit information, data, or a signal to other vehicle or infrastructure. The transmitter 432 may include an radio frequency (RF) circuit including a transmitter antenna.

The transmitter 432 may transmit information to a second other vehicle capable of performing vehicle-to-vehicle communication.

The transmitter 432 may transmit recognition information for the vehicle 100 to the second other vehicle.

Here, the recognition information for the vehicle 100 may be information necessary for the second other vehicle to recognize the vehicle 100. The recognition information for the vehicle 100 may include presence information, location information, speed information, information on an occupied lane, direction information, and navigation information regarding the vehicle 100.

Meanwhile, the recognition information for the vehicle 100 capable of performing vehicle-to-vehicle communication may be referred to as a beacon message.

The transmitter 432 may transmit the recognition information for the vehicle to the second other vehicle, along with recognition information for a first other vehicle.

Here, the recognition information for the first other vehicle may include information on the first other vehicle acquired by an object detection apparatus 300. For example, the recognition information for the first other vehicle may include presence information, location information, speed information, information on an occupied lane, direction information, and navigation information regarding the first other vehicle.

Meanwhile, the recognition information for the first other vehicle incapable of performing vehicle-to-vehicle communication may be referred to as an N-beacon message.

The recognition information for the first other vehicle may include ID information distinguishable from the recognition information for the vehicle 100.

The transmitter 432 may operate under the control of the processor 470.

In some embodiments, the receiver 431 and the transmitter 432 may be integrally formed. In this case, a receiving RF circuit and a transmitting RF circuit may be integrally formed as a communication RF circuit.

The processor 470 may control overall operations of each unit of the communication apparatus 400.

The processor 470 may receive sensing information regarding the first other vehicle from the object detection apparatus 300 through the interface unit 480.

The first other vehicle may be a vehicle located in the vicinity of the vehicle 100 and incapable of performing vehicle-to-vehicle communication.

The processor 470 may generate recognition information for the first other vehicle based on the sensing information.

Here, the recognition information for the first other vehicle may be information necessary to recognize the first other vehicle incapable of performing vehicle-to-vehicle communication. The recognition information for the first other vehicle may include information (object information) of the first other vehicle acquired by the object detection apparatus 300. For example, the recognition information for the first other vehicle may include presence information, location information, speed information, information on an occupied lane, and direction information regarding the first other vehicle.

The recognition information for the first other vehicle may include ID information.

The processor 470 may transmit the recognition information for the first other vehicle to the second other vehicle through the transmitter 432.

The second other vehicle is a vehicle capable of performing vehicle-to-vehicle communication (V2V communication, V2X communication). The second other vehicle may be in plural.

As such, as the recognition information for the first other vehicle is transmitted to the second other vehicle, the second other vehicle may be able to recognize the presence of the first other vehicle and perform travelling with preparation against the first other vehicle.

Meanwhile, the second other vehicle may receive the recognition information for the first other vehicle. Based on ID information included in the recognition information for the first other vehicle, the second other vehicle may confirm that the received recognition information is recognition information for the first other vehicle. Based on ID information, the second other vehicle may determine whether the received recognition information is recognition information for the first other vehicle incapable of performing vehicle-to-vehicle communication or recognition information for the vehicle 100 capable of performing vehicle-to-vehicle communication.

Through the interface unit 480, the processor 470 may receive information on a relative distance between the vehicle 100 and the first other vehicle, and information on a relative speed between the vehicle 100 and the first other vehicle.

The processor 470 may generate the recognition information for the first other vehicle, based on the information on the relative distance between the vehicle 100 and the first other vehicle and the information on the relative speed between the vehicle 100 and the first other vehicle.

The processor 470 may acquire location information of the vehicle 100 through the interface unit 480 from a sensing unit 120 or a navigation system 770.

The processor 470 may generate the recognition information for the first other vehicle, further based on the location information of the vehicle 100. The processor 470 may generate location information of the first other vehicle by adding the information on the relative distance between the vehicle 100 and the first other vehicle to the location information of the vehicle 100.

The processor 470 may acquire speed information of the vehicle 100 through the interface unit 480 from the sensing unit 120.

The processor 470 may generate the recognition information for the first other vehicle, further based on the speed information of the vehicle 100. The processor 470 may generate speed information of the first other vehicle, by adding the information on the relative speed between the vehicle 100 and the first other vehicle to the speed information of the vehicle 100.

The processor 470 may transmit the recognition information for the vehicle 100 to the second other vehicle, along with the recognition information for the first other vehicle.

The processor 470 may transmit the recognition information for the vehicle 100 and the recognition information for the first other vehicle by dividing time.

The processor 470 may alternately transmit the recognition information for the first other vehicle and the recognition information for the vehicle 100 to the second other vehicle. For example, the processor 470 may transmit the recognition information for the first other vehicle in a first time period, and transmit the recognition information for the vehicle 100 in a second time period. The processor 470 may transmit the recognition information for the first other vehicle in a third time period, and the recognition information for the vehicle 100 in a fourth time period. The processor 470 may alternately and repeatedly transmit the recognition information for the first other vehicle and the recognition information for the vehicle 100.

The processor 470 may generate the recognition information for the first other vehicle by Wireless Access in Vehicular Environment (WAVE) scheme.

The processor 470 may generate the recognition information for the first other vehicle in a Basic Safety Message (BSM) format or a Contextual Awareness Message (CAM) format.

Figure 17A:
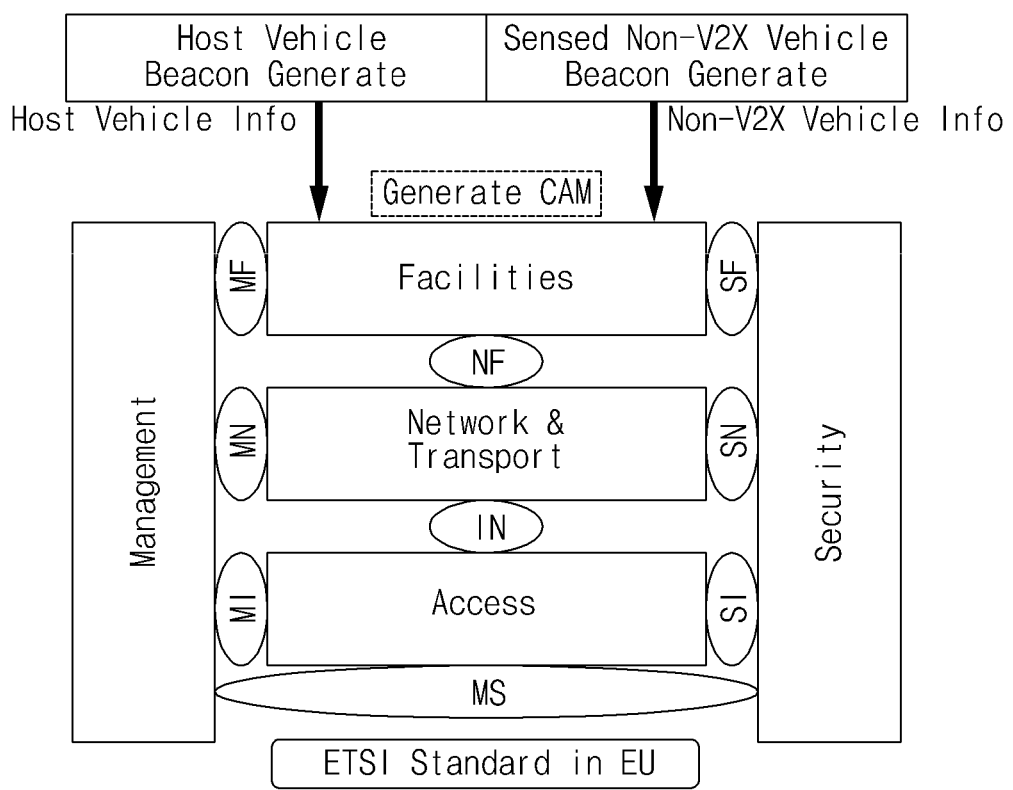
FIGS. 17A and 17B are diagrams referred to in the description of a Basic Safety Message (BSM) format and a Contextual Awareness Message (CAM) format according to an embodiment of the present invention.
Figure 17B:
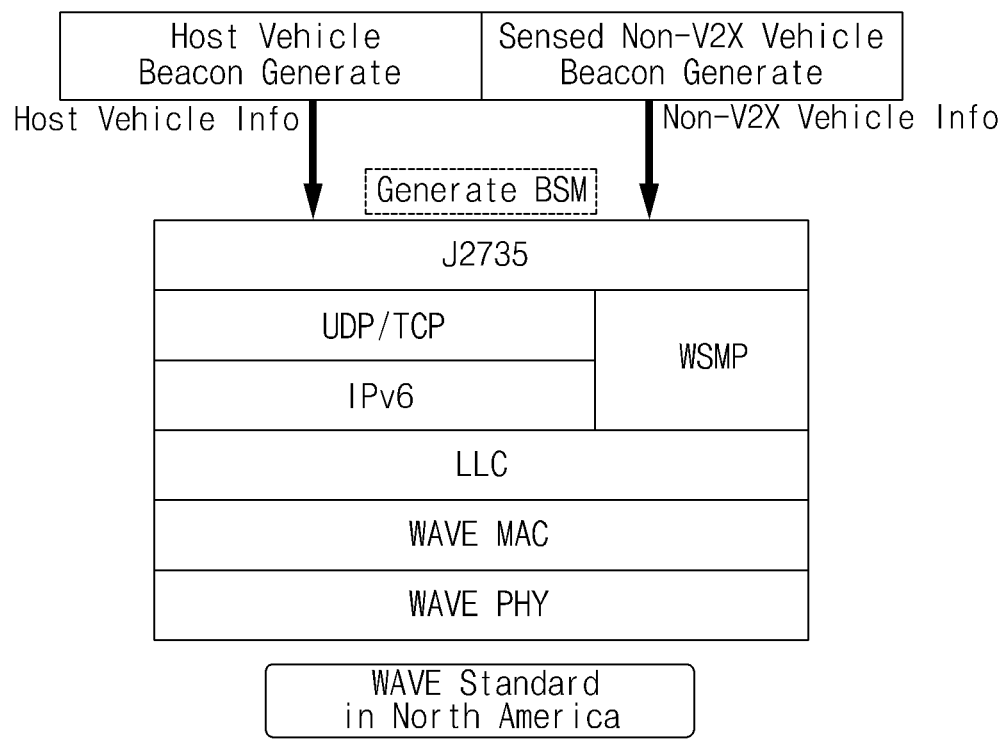

The BSM format (exemplified in FIG. 17B) is a vehicle-to-vehicle communication format used in North America. The CAM format (exemplified in FIG. 17A) is a vehicle-to-vehicle communication format used in Europe. The BSM format and the CAM format are communication formats apparent to those skilled in the art, and a detailed description thereof is herein omitted.

The processor 470 may receive recognition information for at least one other vehicle through the receiver 431 from at least one other vehicle capable of performing vehicle-to-vehicle communication. Here, recognition information may be recognition information necessary to recognize other vehicle capable of performing vehicle-to-vehicle communication. For example, the recognition information for the other vehicle may include information on the presence, location information, speed information, information on an occupied lane, and direction information regarding the other vehicle.

The processor 470 may determine that the first other vehicle is a vehicle incapable of performing vehicle-to-vehicle communication, by comparing the received recognition information and sensing information regarding the first other vehicle.

The object detection apparatus 300 may generate sensing information by sensing other vehicle located in the vicinity of the vehicle 100.

The processor 470 may recognize the first other vehicle incapable of performing vehicle-to-vehicle communication, by comparing recognition information for other vehicle and sensing information regarding other vehicle located in the vicinity of the vehicle 100

For example, through the object detection apparatus 300, the processor 470 may acquire sensing information regarding a first other vehicle, a second other vehicle, and a third other vehicle located in the vicinity of the vehicle 100. The processor 470 may receive recognition information for the second other vehicle and recognition information for the third other vehicle through the receiver 431. In this case, the processor 470 may determine that the first other vehicle detected in the vicinity of the vehicle 100 and having no recognition information acquired therefor is a vehicle incapable of performing vehicle-to-vehicle communication.

If the first other vehicle is located in front of the vehicle 100, the processor 470 may generate recognition information for the first other vehicle.

A plurality of vehicles capable of performing vehicle-to-vehicle communication may travel on a road on which a plurality of lanes is formed. In this case, if the plurality of vehicles respectively generate and transmit recognition information for the first other vehicle incapable of performing vehicle-to-vehicle communication, excessive communication traffic may be resulted. In addition, for a vehicle receiving the recognition information for the first other vehicle, incorrect information may be received because the recognition information for the first other vehicle is received from the plurality of vehicles.

Generally, since the vehicle 100 moves forward, a sensor included in the object detection apparatus 300 senses an area in front of the vehicle 100 more precisely than a side area or a rear area. The object detection apparatus 300 may sense other vehicle located in front of the vehicle 100 more precisely than any other vehicle located on the side of or in rear of the vehicle 100. As the plurality of vehicles capable of performing vehicle-to-vehicle communication senses the first other vehicle in the front and generates recognition information therefor, there are effect of preventing excessive information but generating relatively precise information.

Recognition information for other vehicle incapable of performing vehicle-to-vehicle communication may not be redundantly generated, and the most precise recognition information for the other vehicle may be generated and provided.

The processor 470 may receive first sensing information regarding a first-a other vehicle incapable of performing vehicle-to-vehicle communication from the object detection apparatus 300 through the interface unit 480.

The processor 470 may receive second sensing information regarding a first-b other vehicle incapable of performing vehicle-to-vehicle communication from the object information 300 through the interface unit 480.

In the first time period, the processor 470 may generate and transmit recognition information for the first-a other vehicle based on the first sensing information.

In the second time period, the processor 470 may generate and transmit recognition information for the first-b other vehicle based on the second sensing information Here, the first time period and the second time period may be in sync with the plurality of other vehicles.

Meanwhile, the first other vehicle may be in plural, and the first-a other vehicle and the first-b other vehicle may be included in the first other vehicle.

In doing so, recognition information for other vehicle incapable of performing vehicle-to-vehicle communication may not be generated through cooperation with a plurality of vehicles, and excessive communication traffic may be addressed.

The processor 470 may receive license plate information of the first other vehicle being captured by a camera 310 and acquired through the interface unit.

The processor 470 may generate recognition information for the first other vehicle with the license plate information included therein.

As the license plate information is included, the second other vehicle is able to recognize the first other vehicle precisely.

The processor 470 may receive situation information for the first other vehicle from the object detection apparatus 300 through the interface unit 480.

The processor 470 may control the transmitter 432 not to transmit the recognition information for the first other vehicle, based on the situation information for the first other vehicle.

The processor 470 may not generate recognition information for the first other vehicle, based on the situation information for the first other vehicle.

The situation information for the first other vehicle may include first situation information, second situation information, and third situation information.

The first situation information may be situation information indicating that the first other vehicle is traveling in a dedicated lane.

The processor 470 may receive the first situation information from the object detection apparatus 300 through the interface unit 480. The processor 470 may control the transmitter 432 not to transmit the recognition information for the first other vehicle, based on the first situation information.

In the case where the first other vehicle is traveling in a dedicated lane, the first other vehicle may not disturb traveling of a vehicle capable of performing vehicle-to-vehicle communication, including the vehicle 100, and thus, the recognition information for the first other vehicle is not required. As unnecessary information is not transmitted, there is an effect of not affecting a communication traffic condition.

The second situation information may be situation information indicating that a difference in speed between the first other vehicle and the vehicle 100 is equal to or greater than a reference value.

The processor 470 may receive the second situation information from the object detection apparatus 300 through the interface unit 480. The processor 470 may control the transmitter 432 not to transmit the recognition information for the first other vehicle, based on the second situation information.

In the case where the first other vehicle is traveling at low speed, the first other vehicle may not disturb traveling of a vehicle capable of performing vehicle-to-vehicle communication, including the vehicle 100, and thus, the recognition information for the first other vehicle is not required. As unnecessary information is not transmitted, there is an effect of not affecting a communication traffic condition.

The third situation information may be situation information indicating that a direction of travel of the first other vehicle is different from a direction of travel of the vehicle 100.

The processor 470 receive the third situation information from the object detection apparatus 300 through the interface unit 480. The processor 470 may control the transmitter 432 not to transmit the recognition information for the first other vehicle, based on the third situation information.

In the case where the first other vehicle is traveling in a direction different from the direction of travel of the vehicle 100, the first other vehicle may not disturb traveling of a vehicle capable of performing vehicle-to-vehicle communication, including the vehicle 100, and thus, the recognition information for the first other vehicle is not required. As unnecessary information is not transmitted, there is an effect of not affecting a communication traffic condition.

The interface unit 480 may exchange information, a signal, or data with a difference device included in the vehicle 100. The interface unit 480 may receive information, a signal, or data from a different device included in the vehicle 100. The interface unit 480 may transmit received information, signal, or data to the processor 470. The interface unit 480 may transmit information, signal, or data generated or processed by the processor 470 to a different device included in the vehicle 100.

The interface unit 480 may receive sensing information from the object detection apparatus 300. Here, the sensing information may be sensing information regarding the first other vehicle located in the vicinity of the vehicle 100 and incapable of performing vehicle-to-vehicle communication. The vehicle-to-vehicle communication may be referred to as V2V communication or V2X communication.

The memory 485 is electrically connected to the processor 470. The memory 485 may store basic data for each unit, control data for the operational control of each unit, and input/output data. The memory 485 may be any of various hardware storage devices, such as a ROM, a RAM, an EPROM, a flash drive, and a hard drive. The memory 485 may store various data for the overall operation of the communication apparatus 400, such as programs for the processing or control of the processor 470.

In some embodiments, the memory 485 may be integrally formed with the processor 470, or may be implemented as a sub-component of the processor 470.

The power supply unit 490 may supply power required to operate each component under the control of the processor 470. In particular, the power supply unit 490 may receive power from, for example, a battery inside the vehicle.

Figure 9:
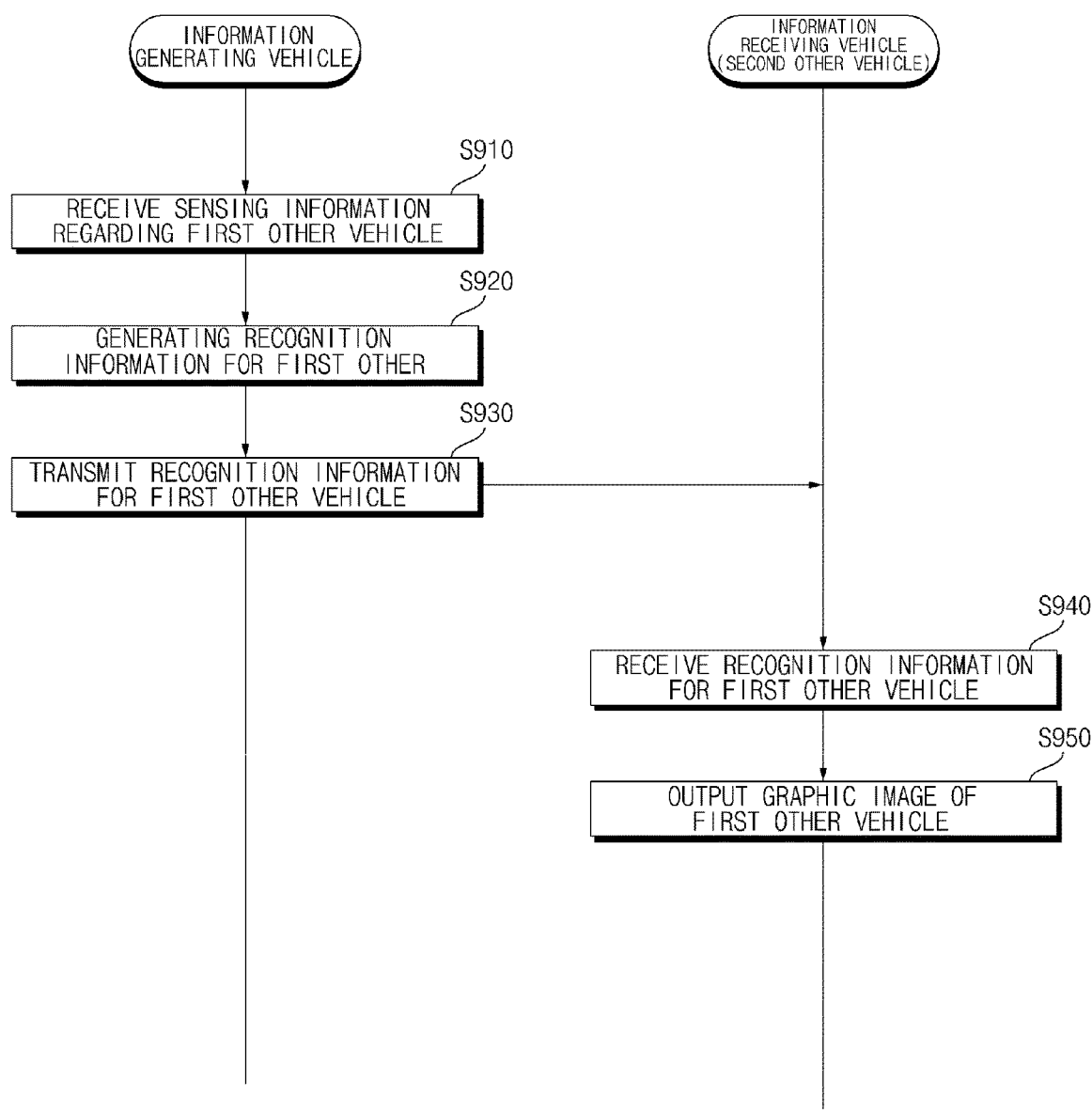
FIG. 9 is a diagram referred to in the description of a communication apparatus and a vehicle according to an embodiment of the present invention.

FIG. 9 is a diagram referred to in the description of a communication apparatus and a vehicle according to an embodiment of the present invention.

Referring to FIG. 9, description is provided by distinguishing an information generating vehicle and an information receiving vehicle.

The communication apparatus 400 described with reference to FIG. 8 may be understood as a communication apparatus included in an information generating vehicle 100*a*.

An information receiving vehicle 100*b* may include the same constituent components as those of the information generating vehicle 100*a*.

The information generating vehicle 100*a* may not just transmit recognition information for other vehicle incapable of performing vehicle-to-vehicle communication, but also receive recognition information for the other vehicle generated by one another vehicle capable of performing vehicle-to-vehicle communication.

The information receiving information 100*b* may not just receive recognition information for other vehicle incapable of performing vehicle-to-vehicle communication, but also generate and transmit recognition information for the another vehicle being generated by one another vehicle capable of performing vehicle-to-vehicle communication.

The information generating vehicle 100*a* may be referred to as the vehicle 100, and the information receiving vehicle 100*b* may be referred to as a second other vehicle.

Firstly, description is provided from the perspective of the vehicle 100*a*.

The processor 470 may receive sensing information regarding a first other vehicle (S910).

The processor 470 may receive the sensing information regarding the first other vehicle from the object detection apparatus 300 through the interface unit 480.

The first other vehicle may be a vehicle located in the vicinity of the vehicle 100 and incapable of performing vehicle-to-vehicle communication.

The processor 470 may generate recognition information for the first other vehicle, based on the sensing information (S920).

Here, the recognition information for the first other vehicle may be information necessary to recognize the first other vehicle incapable of performing vehicle-to-vehicle communication. The recognition information for the first other vehicle may include information (object information) of the first other vehicle acquired by the object detection apparatus 300. For example, the recognition information for the first other vehicle may include presence information, location information, speed information, information on an occupied lane, and direction information regarding the first other vehicle.

The processor 470 may transmit the recognition information for the first other vehicle to the second other vehicle through the transmitter 432 (S930).

The second other vehicle is a vehicle capable of performing vehicle-to-vehicle communication (V2V communication, V2X communication)/The second other vehicle may be in plural. The second other vehicle may be the information receiving vehicle 100*b*.

Next, description is provided from the perspective of the information receiving vehicle 100*b*.

The information receiving vehicle 100*b* may include the user interface apparatus 200, the object detection apparatus 300, the communication apparatus 400, the driving manipulation apparatus 500, the vehicle drive apparatus 600, the vehicle travel system 700, the controller 170, the navigation system 770, the sensing unit 120, the interface unit 130, the memory 140, and the power supply unit 190, as described above with reference to FIG. 7.

The description provided with reference to FIG. 8 may apply to the communication apparatus 400 in the information receiving vehicle 100*b*. That is, the communication apparatus 400 may include the receiver 431, the transmitter 432, the processor 470, the interface unit 480, the memory 485, and the power supply unit 490.

The vehicle 100*b* may receive recognition information for a first other vehicle (S940).

The receiver 431 may receive information from a plurality of other vehicles.

The processor 470 may receive the recognition information from the first other vehicle incapable of performing vehicle-to-vehicle communication, through the receiver 431.

The processor 470 may specify the first other vehicle based on a plurality of items of recognition information for the first other vehicle received from the plurality of other vehicles.

For example, the processor 470 may receive first recognition information for the first other vehicle from A other vehicle through the receiver 431. The processor 470 may receive second recognition information for the first other vehicle from B other vehicle through the receiver 431. The processor 470 may specify the first other vehicle based on a combination of the first recognition information and the second recognition information.

Meanwhile, the first recognition information may include first location information and first speed information for the first other vehicle generated by A other vehicle. The second recognition information may include second location information and second speed information for the first other vehicle generated by B vehicle.

The processor 470 may generate a graphic image corresponding to the first other vehicle based on the plurality of items of recognition information for the first other vehicle received from the plurality of other vehicles.

For example, the processor 470 may generate the graphic image based on a combination of the first recognition information and the second recognition information.

The processor 470 may determine reliability of recognition information for the first other vehicle based on the number of other vehicles transmitting the recognition information for the first other vehicle.

For example, the processor 470 may determine reliability of recognition information for the first other vehicle in proportion to the number of other vehicles transmitting the recognition information for the first other vehicle.

For example, the processor 470 may determine reliability of the recognition information for the first other vehicle based on communication strength.

For example, the processor 470 may determine reliability of recognition information for the first other vehicle based on a communication reliability.

For example, the processor 470 may determine reliability of recognition information for the first other vehicle based on information on a type of a sensor sensing the first other vehicle.

For example, the processor 470 may determine reliability for recognition information for the first other vehicle based on information on a position where a sensor sensing the first other vehicle is attached.

The vehicle 100*b* may display a graphic image corresponding to the first other vehicle (S950).

The user interface apparatus 200 may output a graphic image corresponding to the first other vehicle based on recognition information for the first other vehicle through the display unit 251.

The user interface apparatus 200 may generate a first graphic image corresponding to the first other vehicle based on first recognition information.

The user interface apparatus 200 may generate a second graphic image corresponding to the first other vehicle based on second recognition information.

The user interface apparatus 200 may display a Region of Interest (ROI) that is set to the entire area of the first graphic image and the second graphic image.

The user interface apparatus 200 may display an ROI that is set to an area where the first graphic image and the second graphic image overlap each other.

The user interface apparatus 200 may determine a shape of a graphic image based reliability determined by the processor 470.

The user interface apparatus 200 may determine color, transparency, or size of the graphic image by the reliability.

FIGS. 10 to 13B are for explaining the information generating vehicle 100a shown in FIG. 9.

Figure 10:
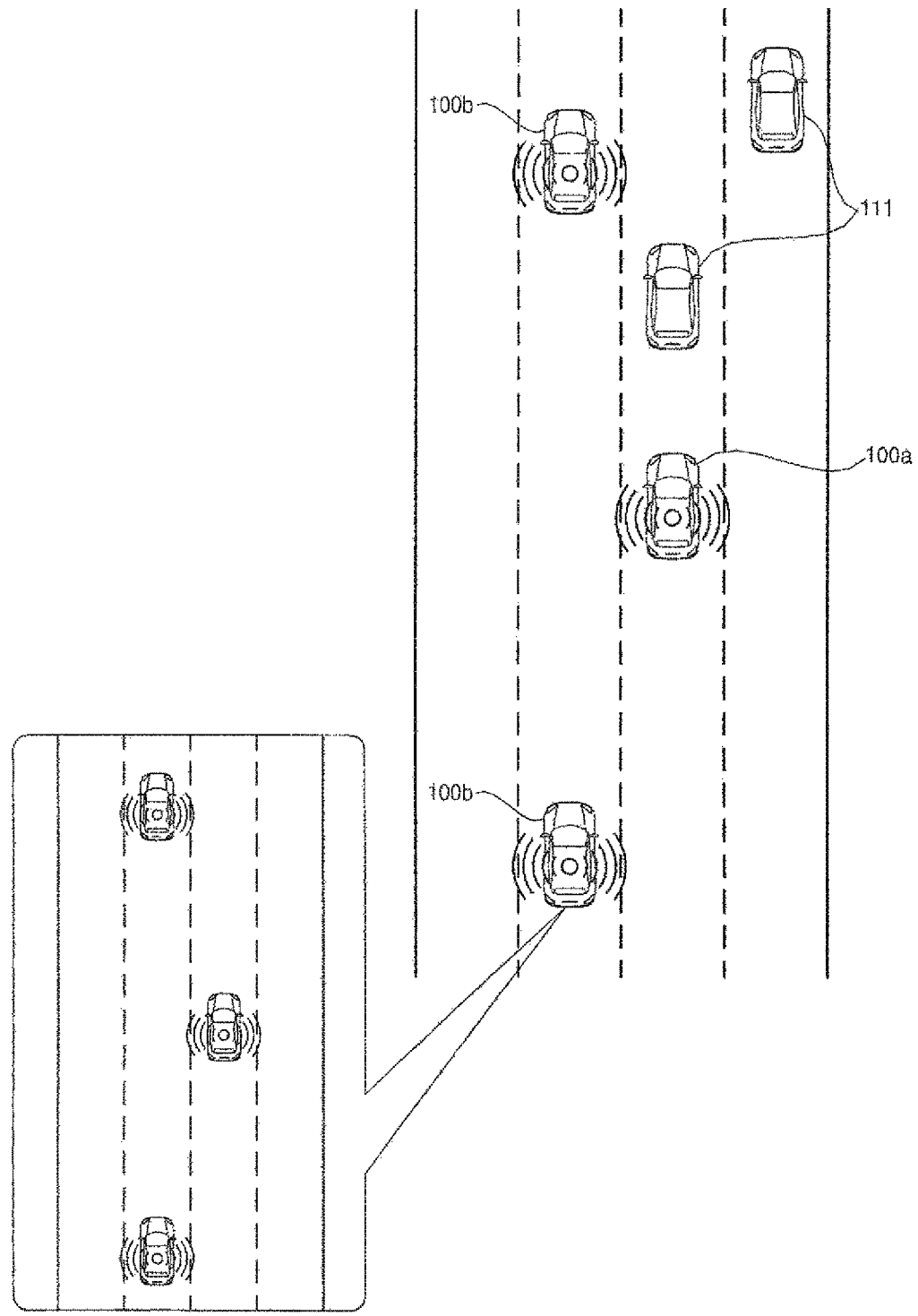
FIG. 10 is a diagram referred to in the description of vehicle-to-vehicle communication according to an embodiment of the present invention.

FIG. 10 is a diagram referred to in the description of vehicle-to-vehicle communication according to an embodiment of the present invention.

Referring to the drawing, the vehicle 100a may communicate with the second other vehicle 100b through the communication apparatus 400. The vehicle 100a and the second other vehicle 100b may be vehicles each including the communication apparatus 400 and thereby capable of communicating with each other. The second other vehicle 100b may be in plural.

The vehicle 100a may generate recognition information for the vehicle 100a and share the recognition information with the second other vehicle 100b. Here, the recognition information for the vehicle 100a may be information necessary for the second other vehicle 100b to recognize the vehicle 100a.

The second other vehicle 100b may receive the recognition information for the vehicle 100a. Upon receiving the recognition information for the vehicle 100a, the second other vehicle 100b may recognize the presence of the vehicle 100a. The second other vehicle 100b may acquire location information, speed information, information on an occupied lane, direction information, and navigation information regarding the vehicle 100 based on the recognition information for the vehicle 100a.

The vehicles 100a and 100b capable of performing vehicle-to-vehicle communication and a vehicle 1111 incapable of performing vehicle-to-vehicle communication may be travelling together on a roadway. Here, the vehicle 1111 incapable of performing vehicle-to-vehicle communication may be referred to as a first other vehicle.

If the first other vehicle is not detected by provided sensors 310, 320, 330, 340, and 350, the vehicles 100a and 100b recognizing each other through vehicle-to-vehicle communication are not able to recognize the presence of the vehicle 1111 through vehicle-to-vehicle communication.

In this case, the first other vehicle 1111 may disturb travelling the vehicles 100a and 100b capable of performing vehicle-to-vehicle communication. In order to solve this problem, the communication apparatus 400 according to an embodiment of the present invention is provided.

Figure 11A:
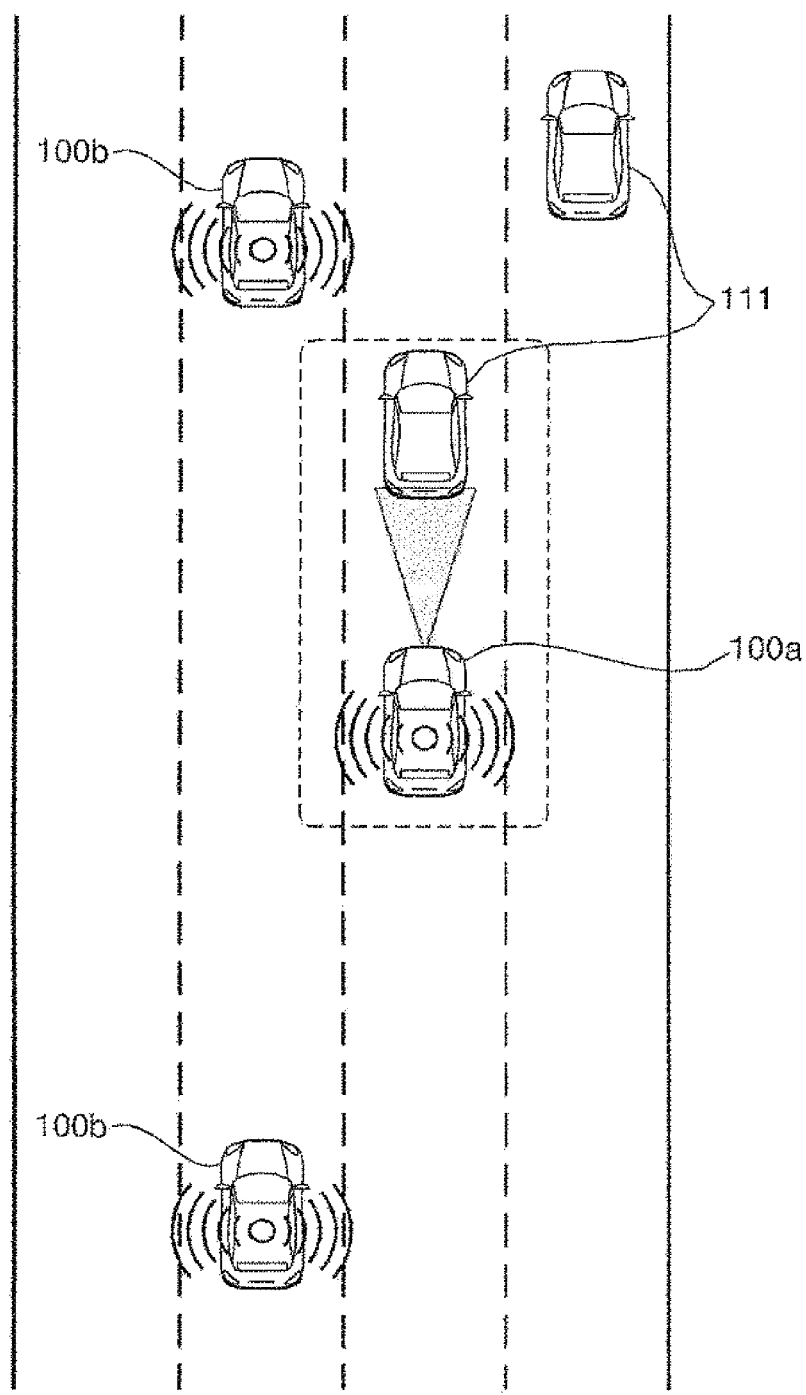
FIGS. 11A and 11B are diagrams referred to in the description of acquiring sensing information regarding a first other vehicle according to an embodiment of the present invention.
Figure 11B:
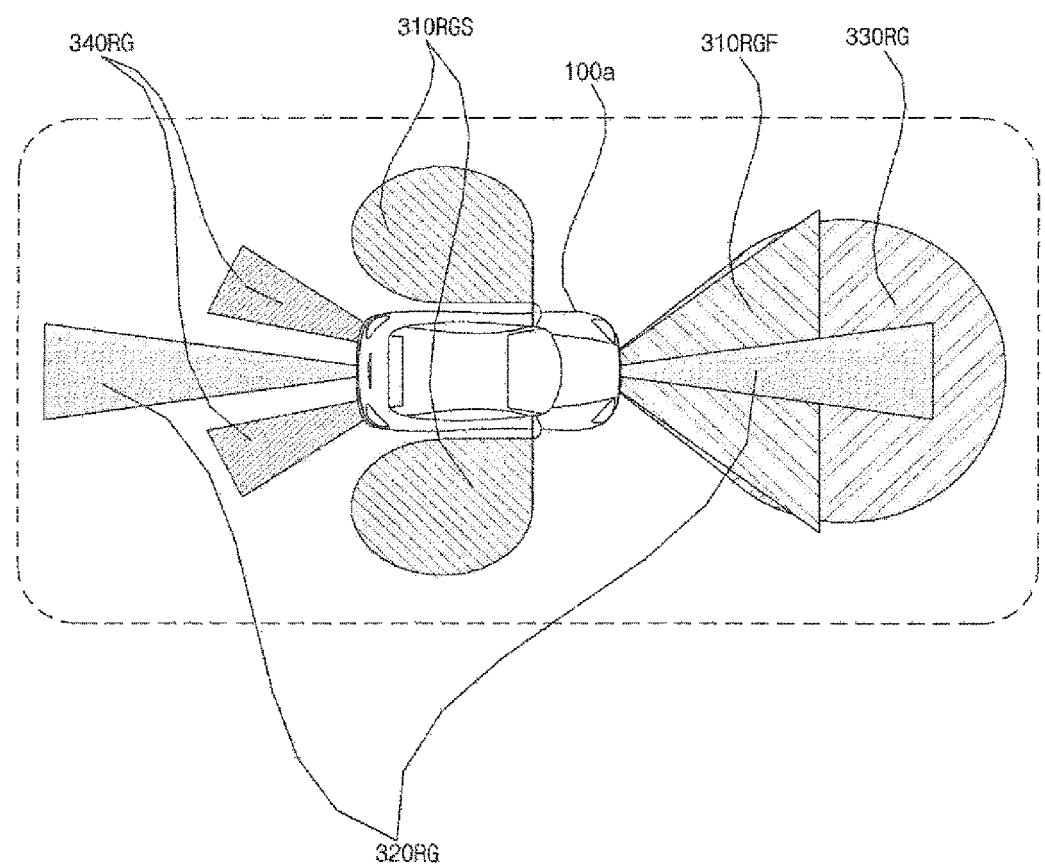

FIGS. 11A and 11B are diagrams referred to in the description of acquiring sensing information regarding the first other vehicle according to an embodiment of the present invention.

As shown in FIG. 11A, the object detection apparatus 300 may detect the first other vehicle 1111. The object detection apparatus 300 may generate information regarding the first other vehicle 1111. The information regarding the first other vehicle 1111 may be referred to as sensing information regarding the first other vehicle 1111.

The object detection apparatus 300 may include at least one sensor from among the camera 310, the radar 320, the lidar 330, the ultrasonic sensor 340, and the infrared sensor 350.

The object detection apparatus 300 may detect the first other vehicle 1111 using at least one sensor from among the camera 310, the radar 320, the lidar 330, the ultrasonic sensor 340, and the infrared sensor 350.

FIG. 11B shows an example of detection ranges of various sensors included in the object detection apparatus 300.

A first detection range 310RGF may be a forward detection range from the camera 310.

A second detection range 310RGS may be a lateral detection range from the camera 310.

A third direction range 320RG may be a rearward detection range from the radar 320.

A fourth detection range 330RG may be a forward detection range from the lidar 330.

A fifth detection range 340RG may be a rearward lateral direction range from the ultrasonic sensor 340.

In the case where the first other vehicle is located in at least one of the first to fifth detection ranges, the object detection apparatus 300 may detect the first other vehicle 1111 and generate sensing information regarding the first other vehicle 1111.

The processor 470 may receive the sensing information regarding the first other vehicle 1111 from the object detection apparatus 300 through the interface unit 480.

The processor 470 may generate recognition information for the first other vehicle 1111 based on the sensing information regarding the first other vehicle 1111.

FIG. 12A to 12D are diagrams referred to in the description of generating recognition information for the first other vehicle according to an embodiment of the present invention.

Figure 12A:
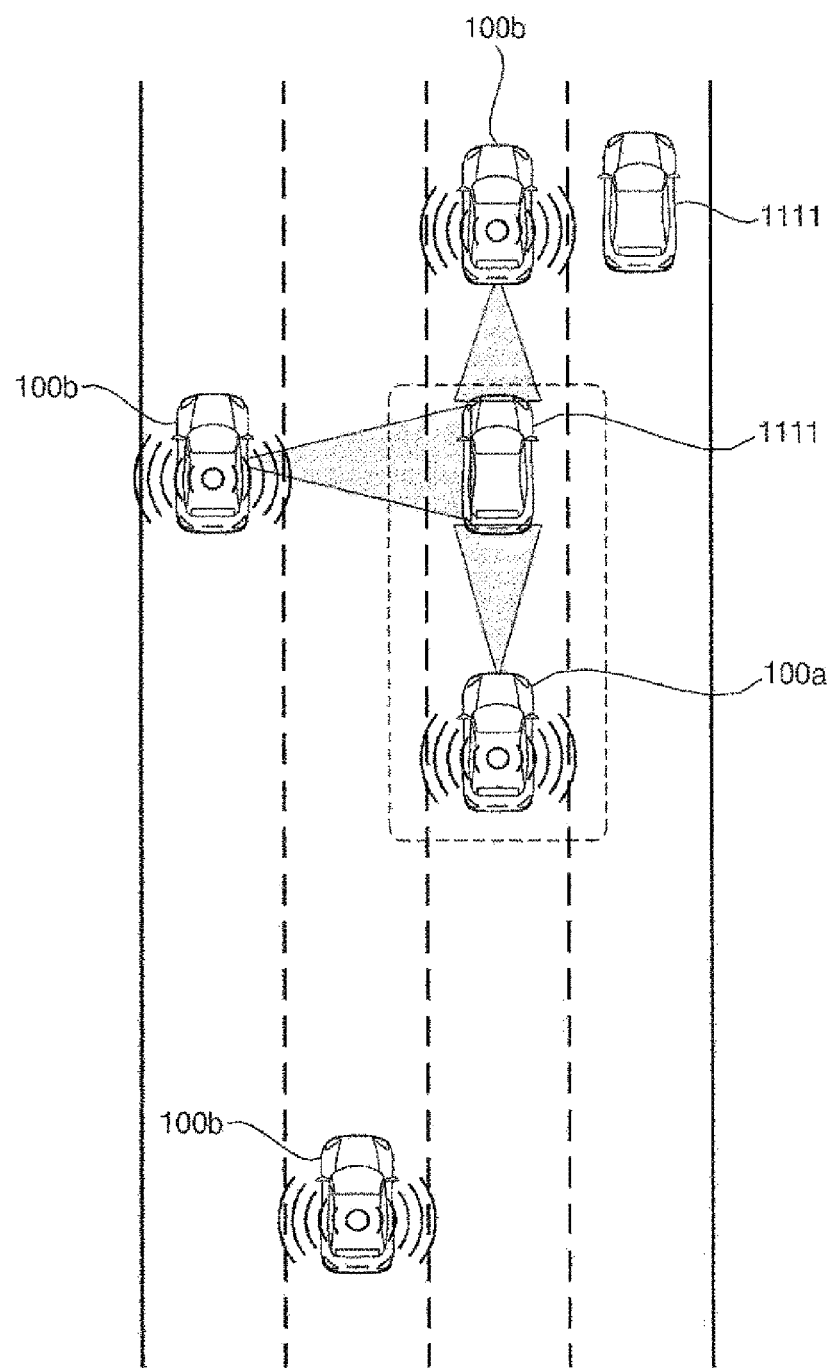
FIG. 12A to 12D are diagrams referred to in the description of generating recognition information for a first other vehicle according to an embodiment of the present invention.

Referring to FIG. 12A, the object detection apparatus 300 of the vehicle 100a may detect the first other vehicle 1111 through at least one sensor from among the camera 310, the radar 320, the lidar 330, the ultrasonic sensor 340, and the infrared sensor 350, and generate sensing information regarding the first other vehicle 1111.

The processor 470 may generate recognition information for the first other vehicle 1111 based on the sensing information regarding the first other vehicle 1111.

The object detection apparatus 300 of the second other vehicle 100b may detect the first other vehicle 1111 through at least one sensor from among the camera 310, the radar 320, the lidar 330, the ultrasonic sensor 340, and the infrared sensor 350, and generate sensing information regarding the first other vehicle 1111.

As shown in FIG. 12A, the first other vehicle 1111 may be located in front of the vehicle 100a. The first other vehicle 1111 may be located on the side of or in rear of the second other vehicle 100b.

The vehicle 100a and the second other vehicle 100b may respectively generate recognition information for the first other vehicle 1111 based on the respective sensing information.

If the recognition information for the first other vehicle 1111 respectively generated by the vehicle 100a and the second other vehicle 100b are shared, excessive communication traffic may be resulted.

Figure 12B:
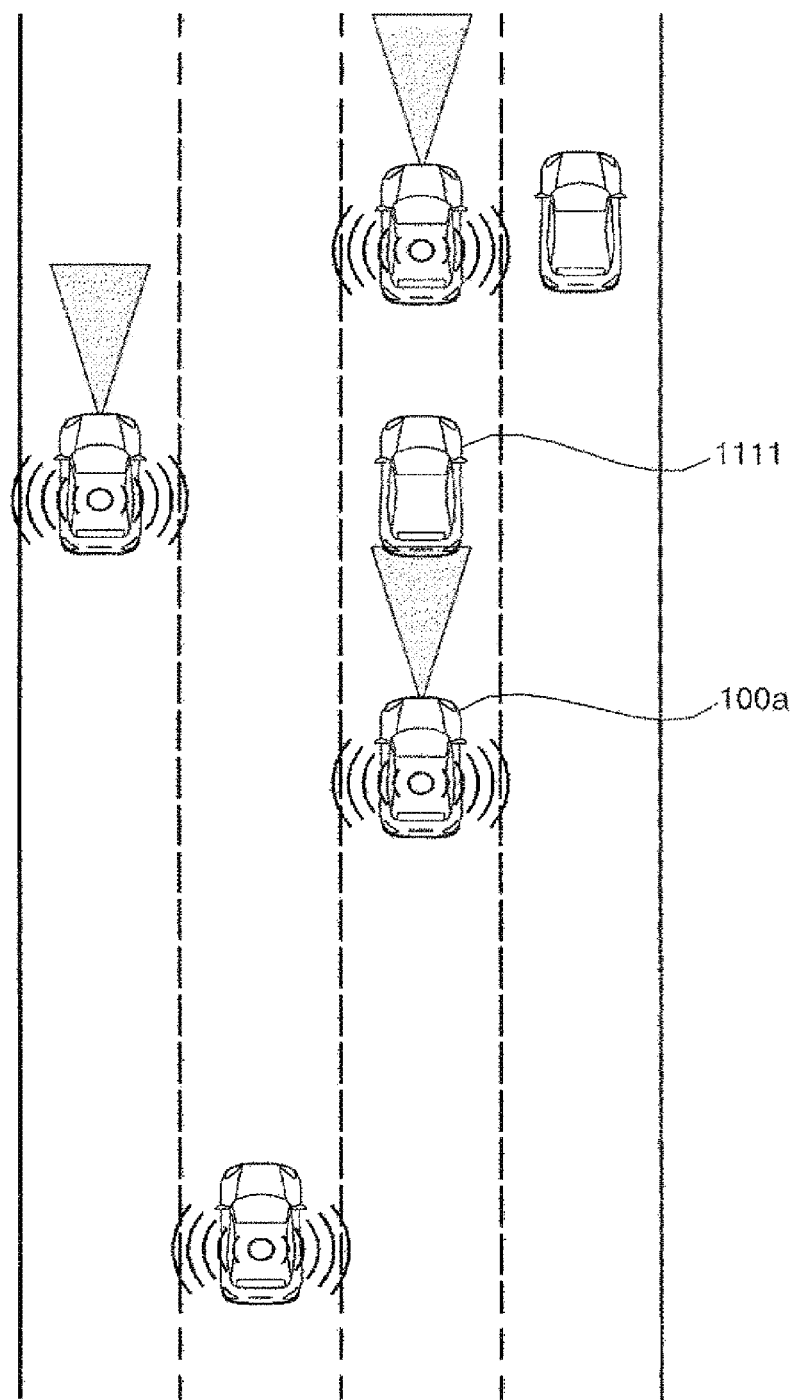

Referring to FIG. 12B, when the first other vehicle 1111 is located in front of the vehicle 100a, the processor 470 may generate recognition information for the first other vehicle 1111.

When the first other vehicle 1111 is located on the side of or in rear of the vehicle 100a, the processor 470 may not generate recognition information for the first other vehicle 1111.

As recognition information only for the first other vehicle 1111 located in front of the vehicle 100a is generated, excessive communication traffic may be avoided.

Figure 12C:
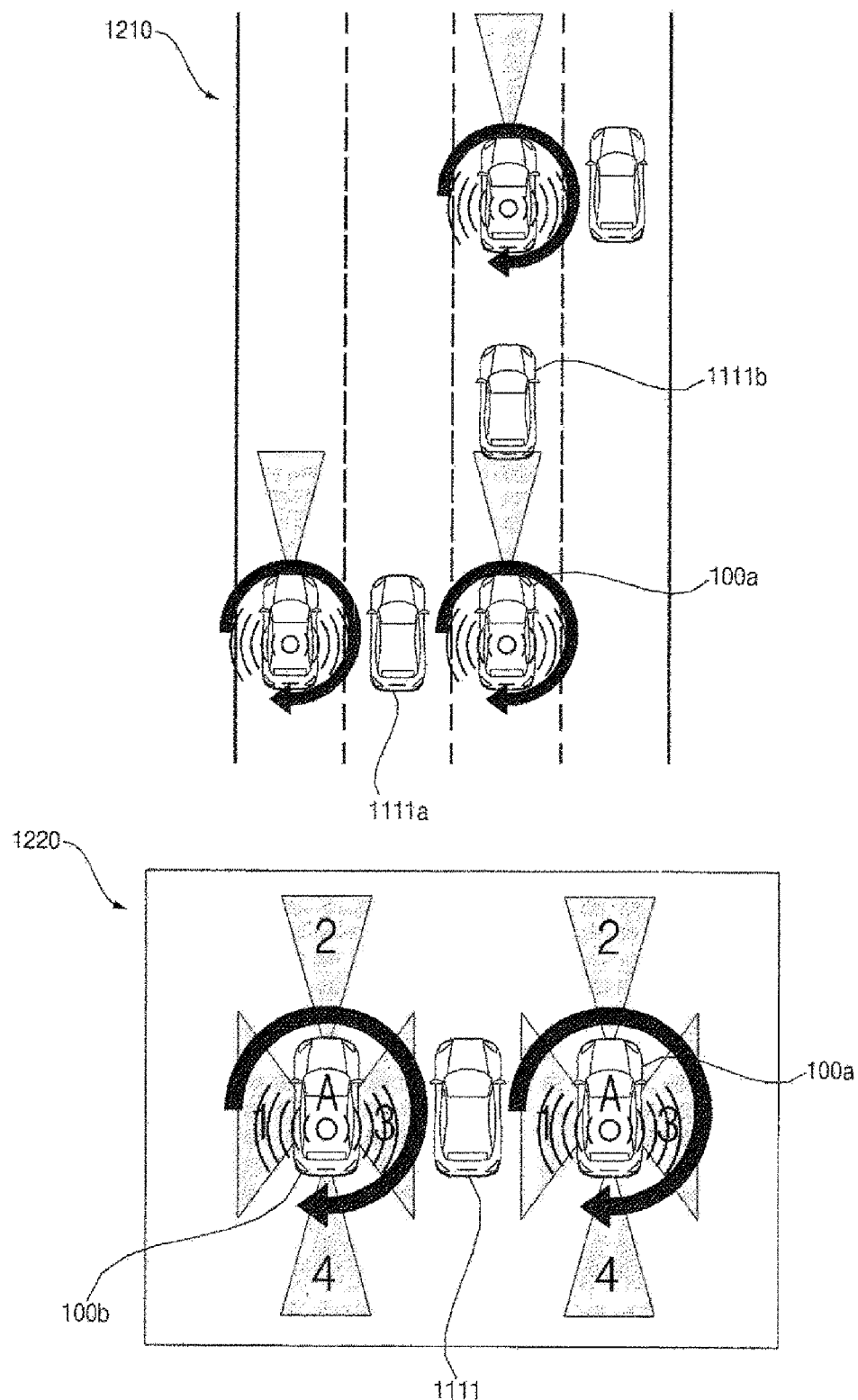

Referring to reference numeral 1210 in FIG. 12C, the processor 470 may receive first sensing information regarding a first-a other vehicle 1111a incapable of performing vehicle-to-vehicle communication from the object detection apparatus 300 through the interface unit 480.

The processor 470 may generate second sensing information regarding a first-b other vehicle 1111b incapable of performing vehicle-to-vehicle communication from the object detection apparatus 300 through the interface unit 480.

The processor 470 may generate and transmit recognition information for the first-a other vehicle 1111a based on the first sensing information in a first time period.

The processor 470 may generate and transmit recognition information for the first-b other vehicle 1111b based on the second sensing information in a second time period.

Here, the second time period may be after the first time period. The first time period and the second time period may be in sync with the other vehicle 100b capable of performing communication with a plurality of vehicles.

Referring to reference numeral 1220 in FIG. 12C, recognition information for the first other vehicle 1111 may be generated by the vehicle 100a. In addition, recognition information for the first other vehicle 1111 may be generated by the second other vehicle 100b.

In the first time period, the recognition information for the first other vehicle 1111 may be generated by the vehicle 100a.

In the second time period, the recognition information for the first other vehicle 1111 may be generated by the second other vehicle 100b.

The vehicle 100a may sequentially generate the recognition information of the first other vehicle 1111 in order of 1→2→3→4 in a clockwise direction around the vehicle 100a, and transmits the recognition information.

The second other vehicle 100b may sequentially generate the recognition information of the first other vehicle 1111 in order of 1→2→3→4 in a clockwise direction around the second other vehicle 100b, and transmits the recognition information.

In this case, the order of 1→2→3→4 may be predetermined between the first other vehicle 100a and the second other vehicle 100b.

The vehicle 100a may generate and transmit the recognition information for the first other vehicle 1111 at the step of 1. The second other vehicle 100b may generate and transmit the recognition information for the first other vehicle 1111 at the step of 3.

As such, as the plurality of vehicles 100a and 100b generates and transmits recognition information for the first other vehicle 1111 by dividing time, excessive communication traffic may be avoided.

Figure 12D:
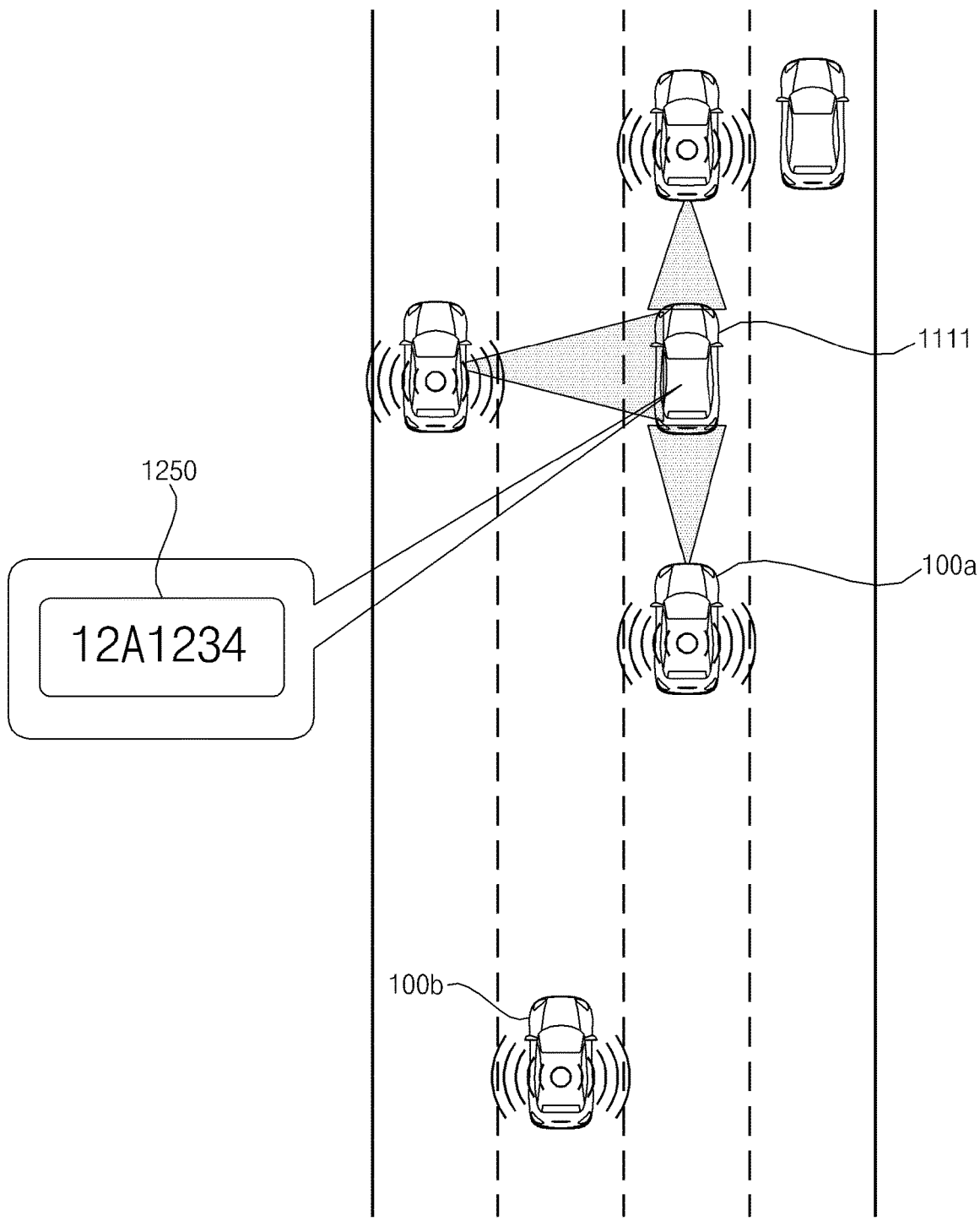

Referring to FIG. 12D, the processor 470 may receive license plate information 1250 of the first other vehicle 1111 being captured by the camera 310 and acquired through the interface unit 480.

The processor 470 may generate recognition information for the first other vehicle 1111 with the license plate information 1250 included therein.

The second other vehicle 100b having received the recognition information for the first other vehicle 1111 may clearly specify the first other vehicle 1111 by comparing the license plate information 1250 of the first other vehicle 1111 and an image of the license plate of the first other vehicle 1111, the image which is acquired by the camera 310 of the second other vehicle 100b.

Figure 13A:
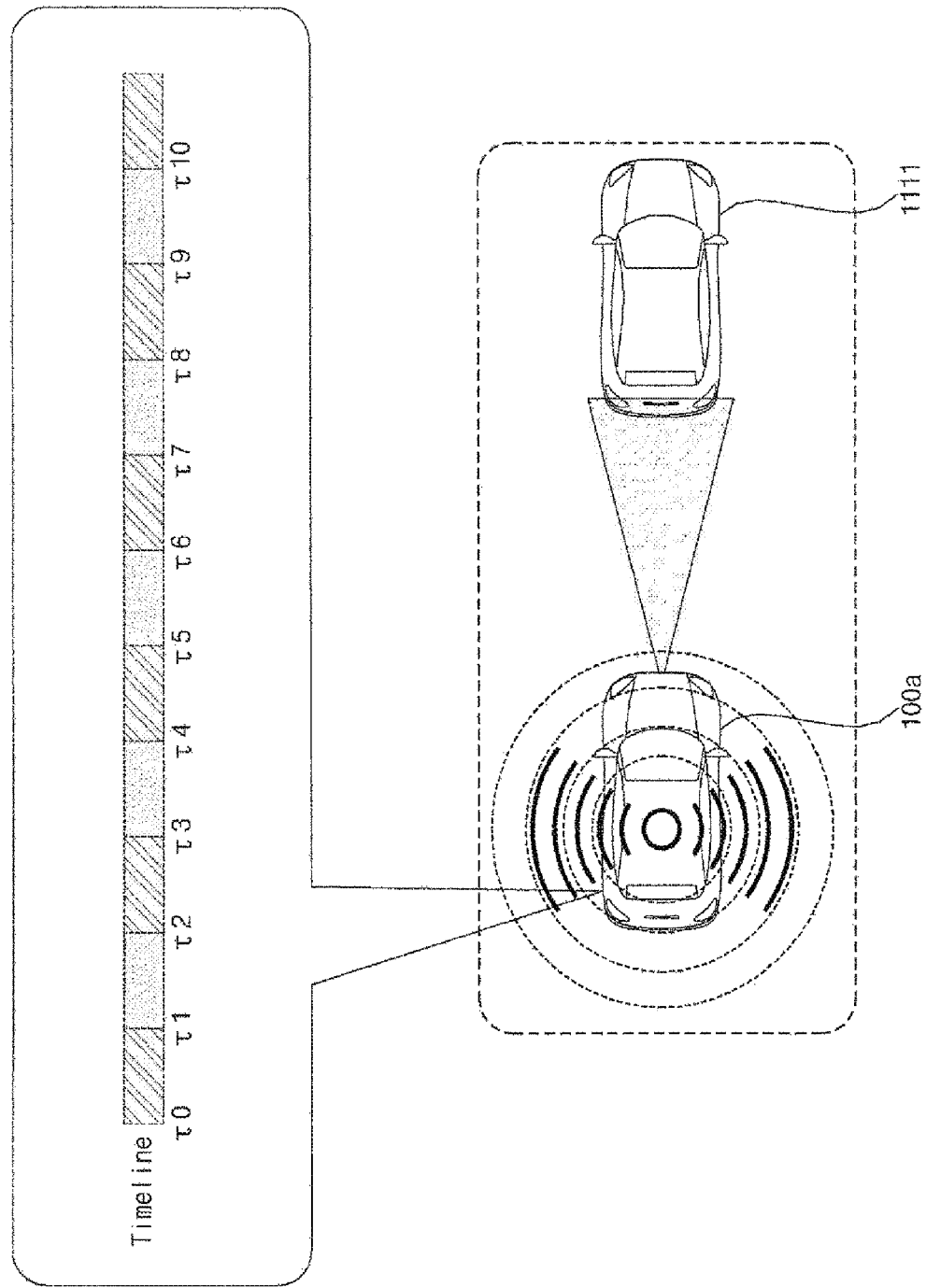
FIGS. 13A and 13B are diagrams referred to in the description of transmitting recognition information according to an embodiment of the present invention.
Figure 13B:
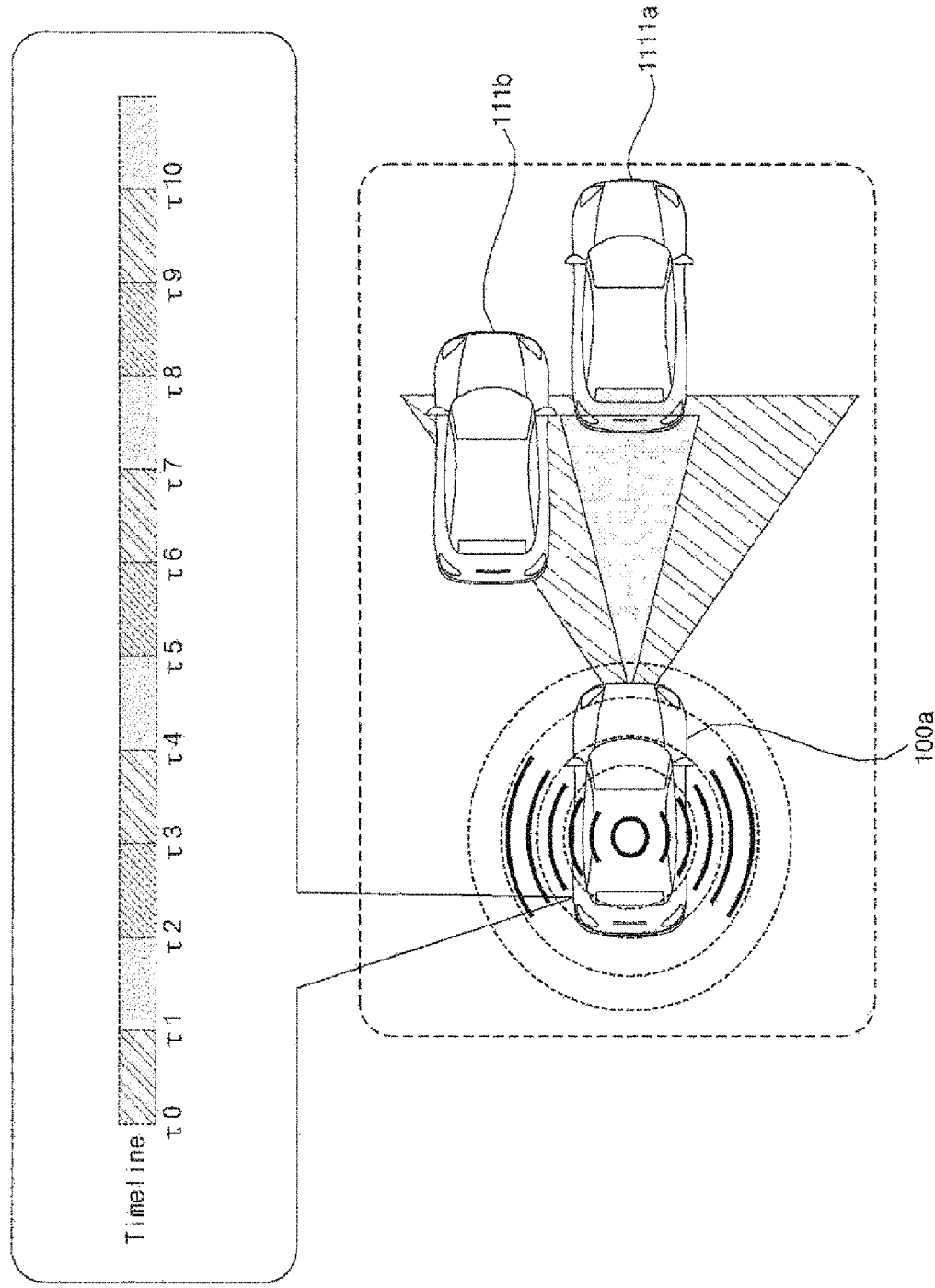

FIGS. 13A and 13B are diagrams referred to in the description of transmitting recognition information according to an embodiment of the present invention.

Referring to FIG. 13A, the processor 470 may transmit recognition information for the vehicle 100a to the second other vehicle, along with recognition information for the first other vehicle 1111.

The processor 470 may transmit the recognition information for the first other vehicle 1111 and the recognition information for the vehicle 100a to the second other vehicle by dividing time.

The processor 470 may alternately transmit the recognition information for the first other vehicle 1111 and the recognition information for the vehicle 100a to the second other vehicle.

For example, in a first time period t0-t1, a third time period t2-t3, a fifth time period t4-t5, a seventh time period t6-t7, and a ninth time period t8-t9, the recognition information for the vehicle 100a may be transmitted.

In addition, in a second time period t1-t2, a fourth time period t3-t4, a sixth time period t5-t6, an eighth time period t7-t8, and a tenth time period t9-t10, the recognition information for the first other vehicle 1111 may be transmitted.

As such, as the recognition information for the vehicle 100a and the recognition information for the first other vehicle 1111 are repeatedly and alternately transmitted, it is possible to transmit information without omission by use of one transmitter 432 alone.

Referring to FIG. 13B, the object detection apparatus 300 may detect other vehicle incapable of performing communication with a plurality of vehicles.

For example, the object detection apparatus 300 may detect a first-a other vehicle 1111a and a first-b other vehicle 1111b.

The first-a other vehicle 1111a and the first-b other vehicle 1111b may be vehicles incapable of performing vehicle-to-vehicle communication.

The processor 470 may generate recognition information for each of the other vehicles incapable of performing vehicle-to-vehicle communication.

For example, the processor 470 may generate recognition information for the first-a other vehicle 1111a and recognition information for the first-b other vehicle 1111b.

The processor 470 may transmit the recognition information for the vehicle 100a and a plurality of items of recognition information for other vehicle incapable of performing communication with a plurality of vehicles to the second other vehicle.

The processor 470 may transmit the recognition information for the vehicle 100a and the plurality of items of recognition information for the other vehicle incapable of performing communication with a plurality of vehicles to the second other vehicle by dividing time.

For example, in a first time period t0-t1, a fourth time period t3-t4, a seventh time period t6-t7, and a tenth time period t9-t10, the recognition information for the vehicle 100a may be transmitted.

In addition, in a second time period t1-t2, a fifth time period t4-t5, and an eighth time period t7-t8, the recognition information for the first-a other vehicle 1111a may be transmitted.

In addition, in a third time period t2-t3, a sixth time period t5-t6, and a ninth time period t8-t9, the recognition information for the first-b other vehicle 1111b may be transmitted.

As such, as the recognition information for the vehicle 100a and a plurality of items of recognition information for other vehicle incapable of performing communication with a plurality of vehicles are alternately and repeatedly transmitted, it is possible to transmit information without omission using one transmitter 432 alone.

Figure 14A:
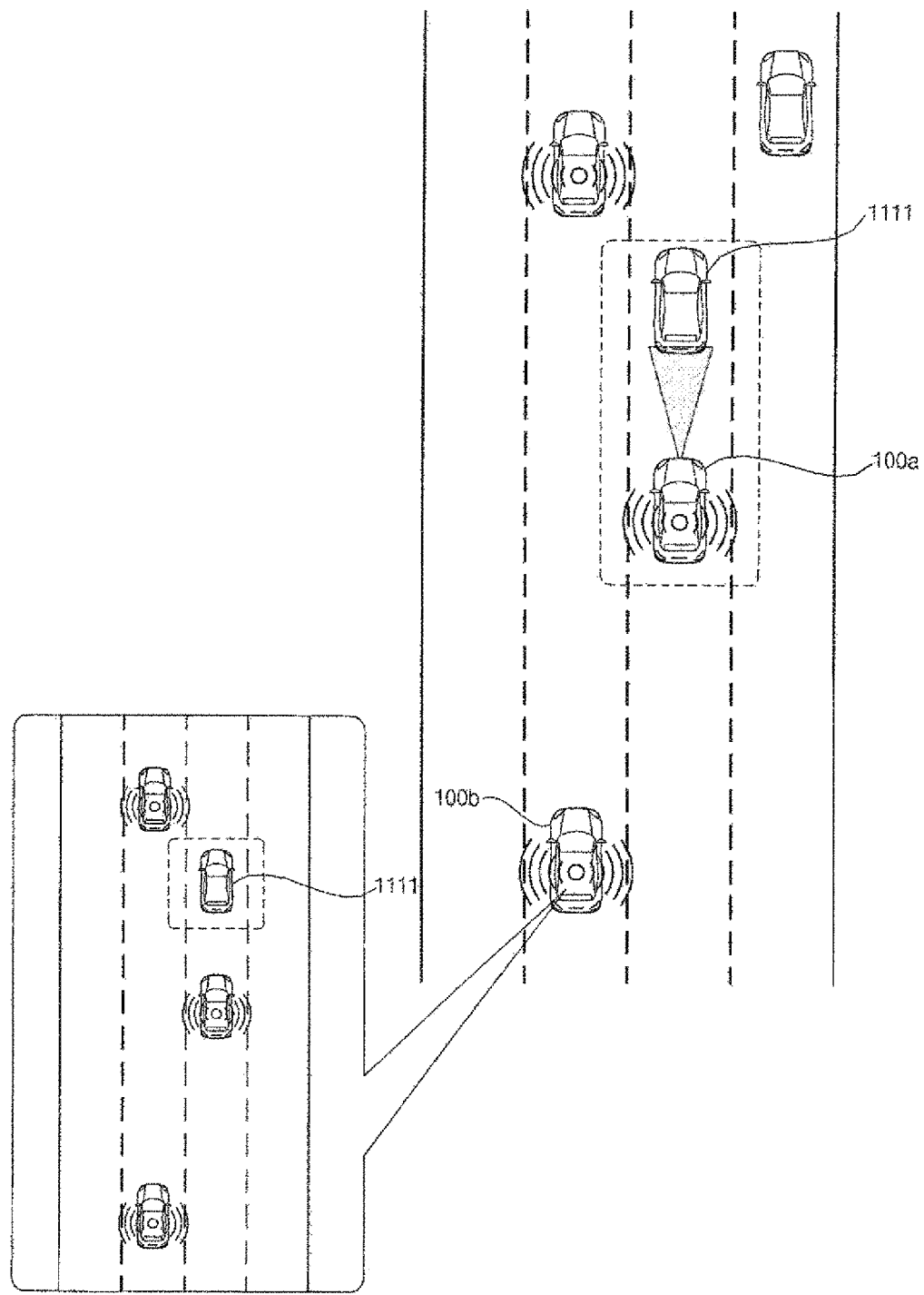
FIGS. 14A to 14H are diagrams referred to in the description of receiving and displaying recognition information for a first other vehicle according to an embodiment of the present invention.
Figure 14B:
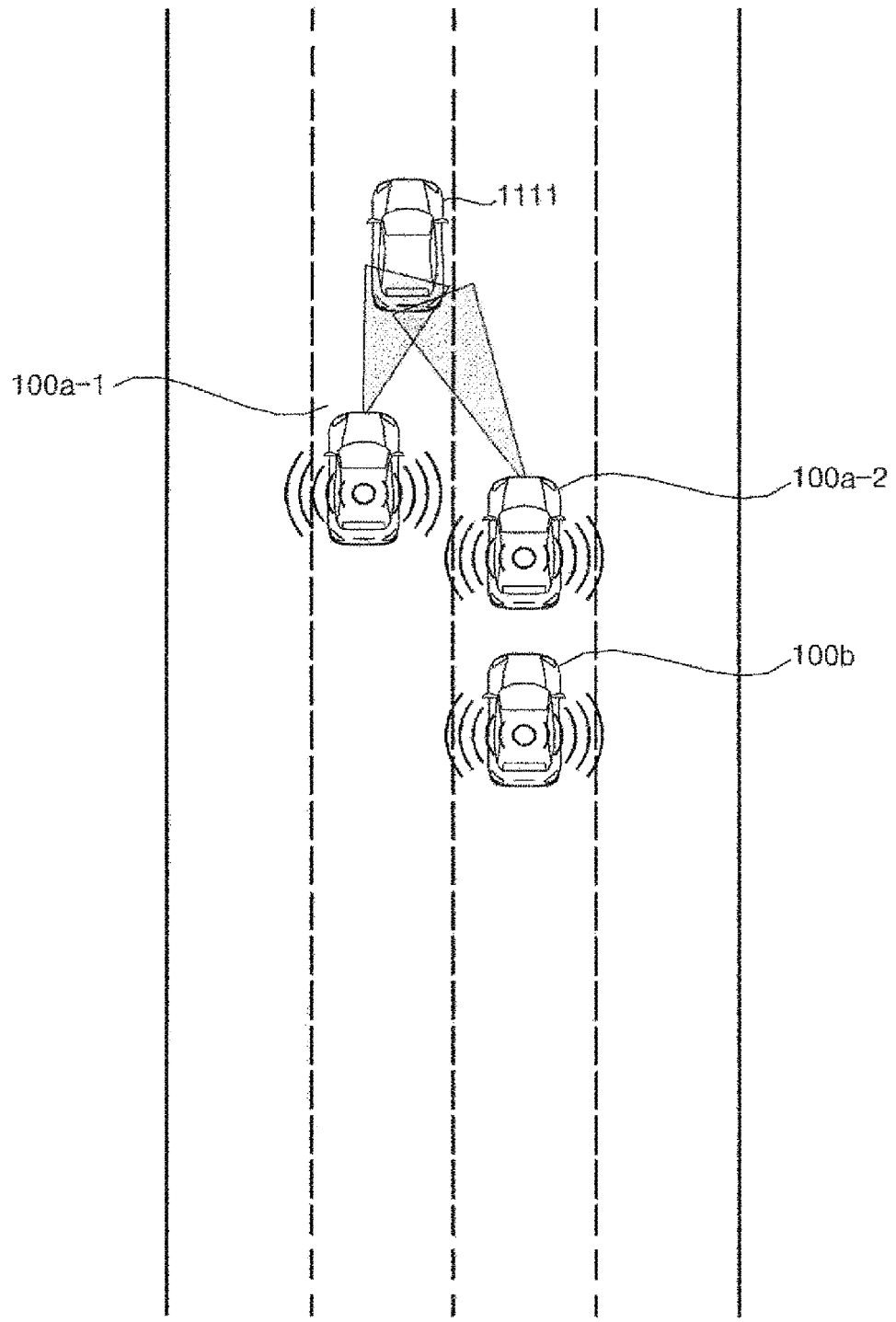
Figure 14C:
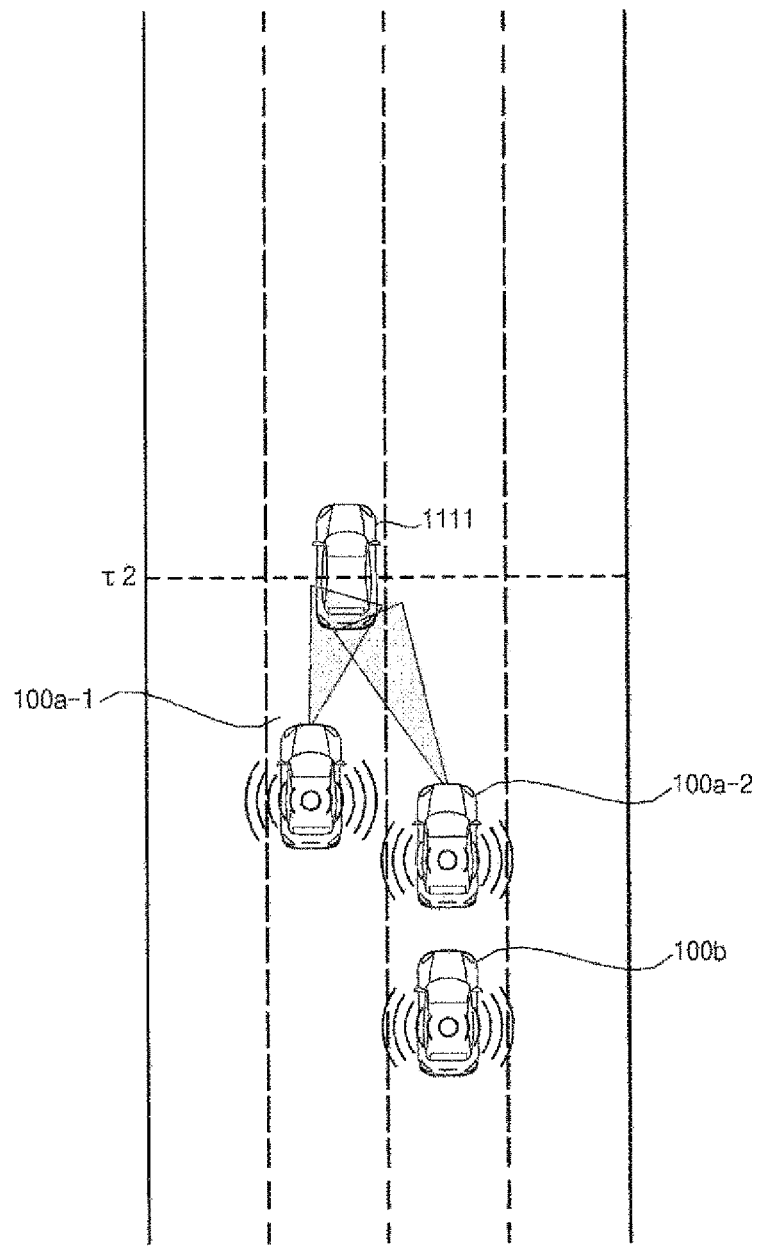
Figure 14D:
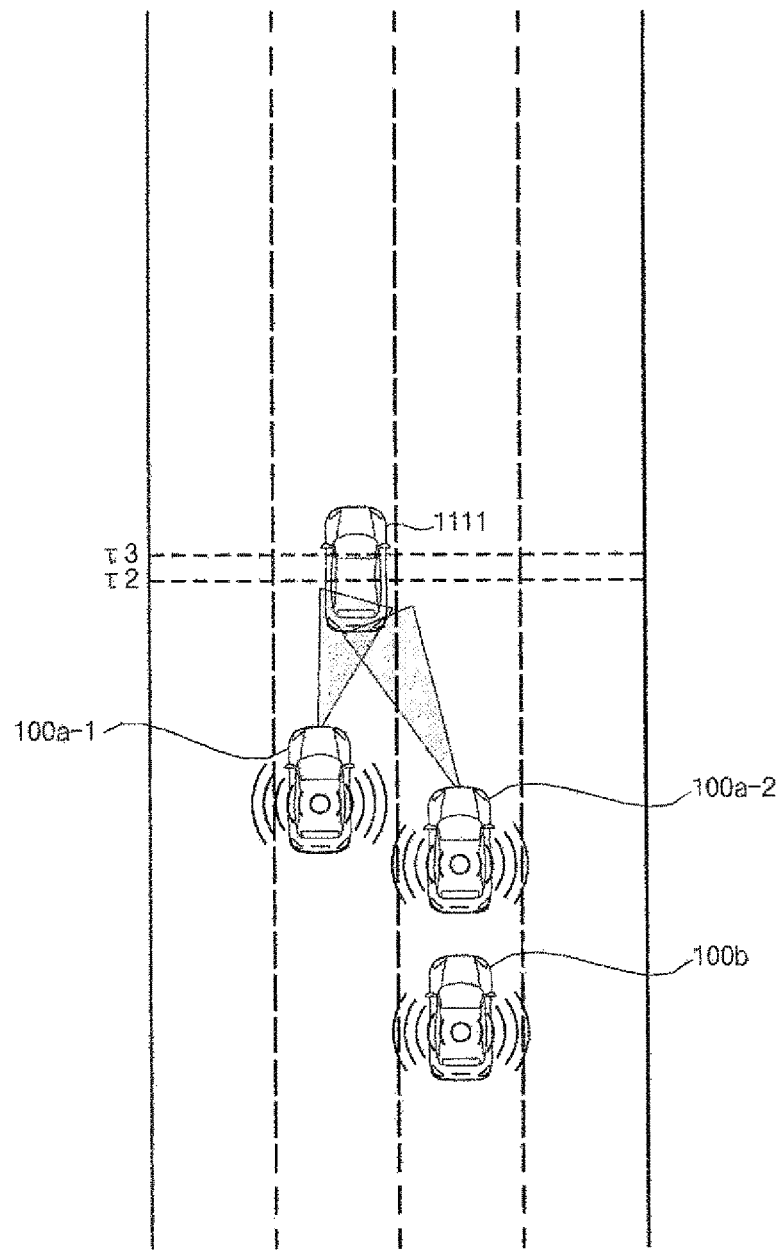
Figure 14E:
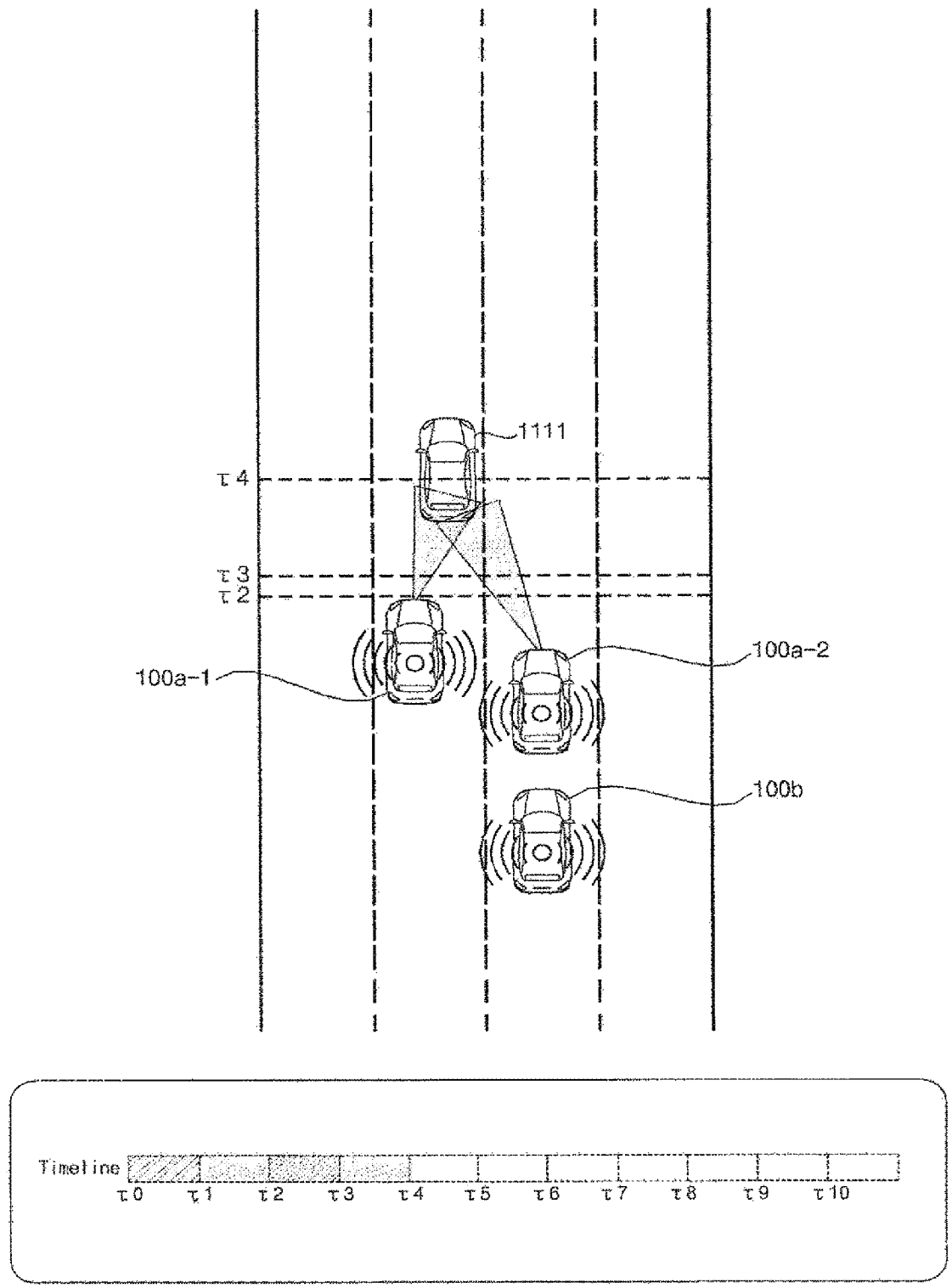
Figure 14F:
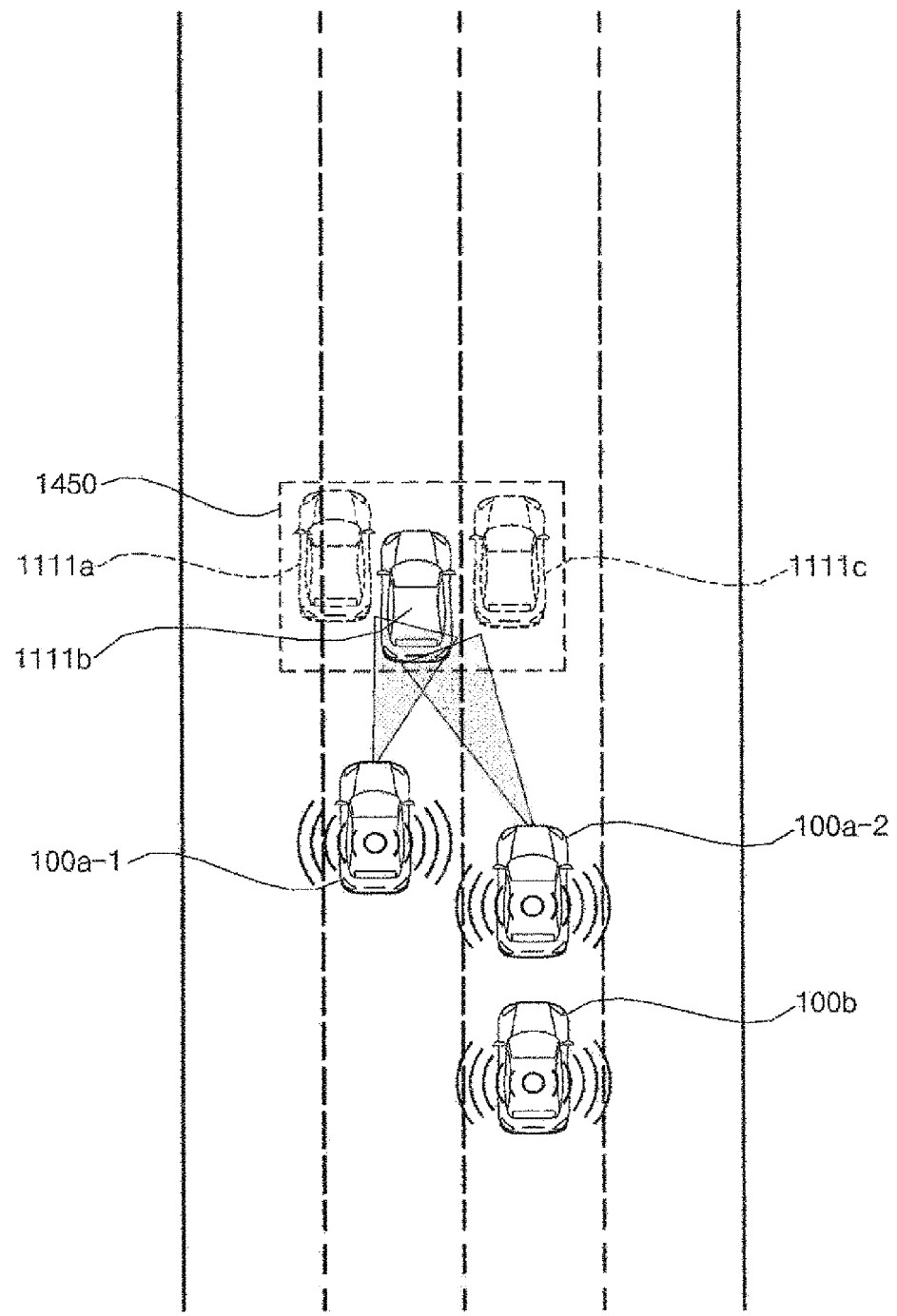
Figure 14G:
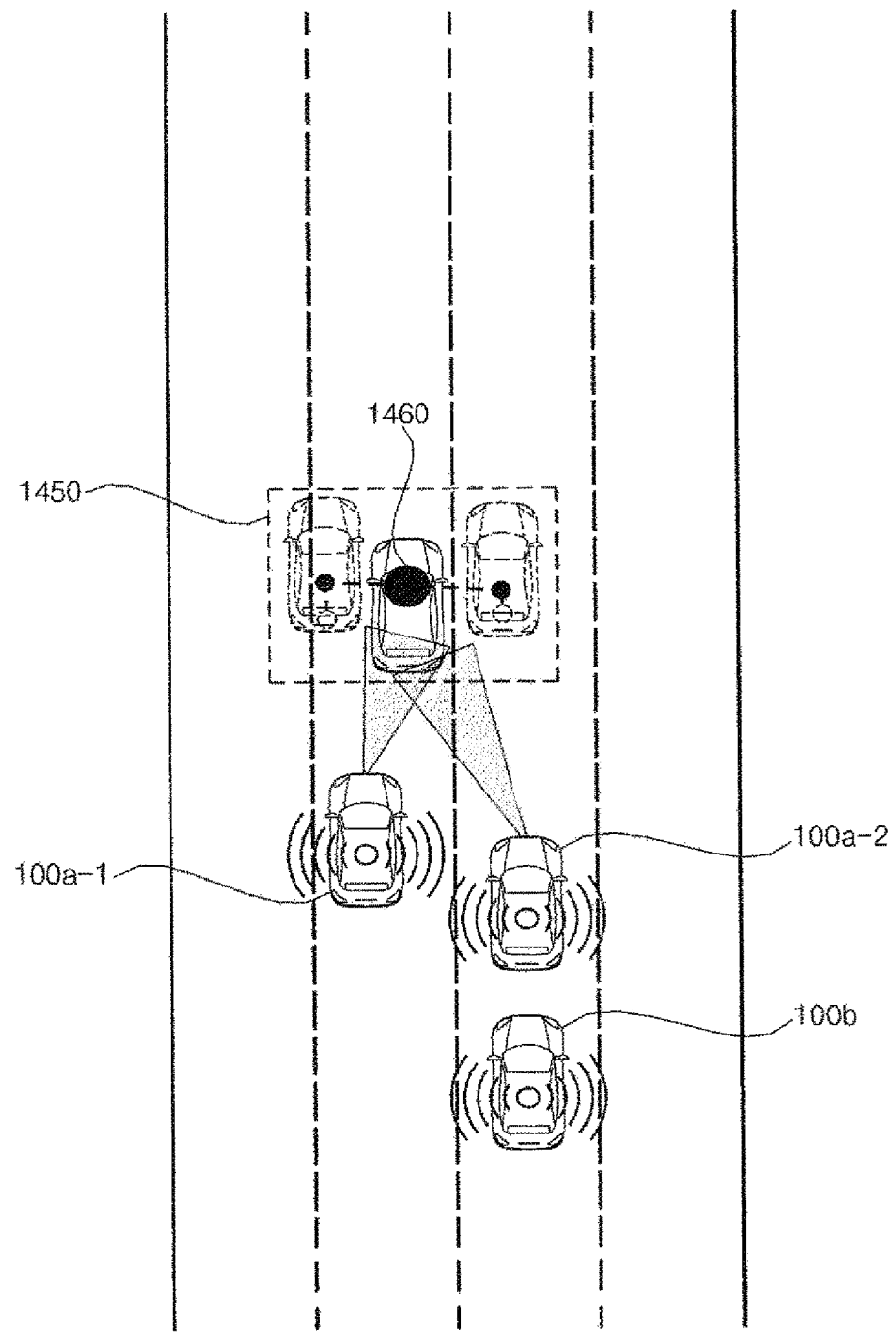
Figure 14H:
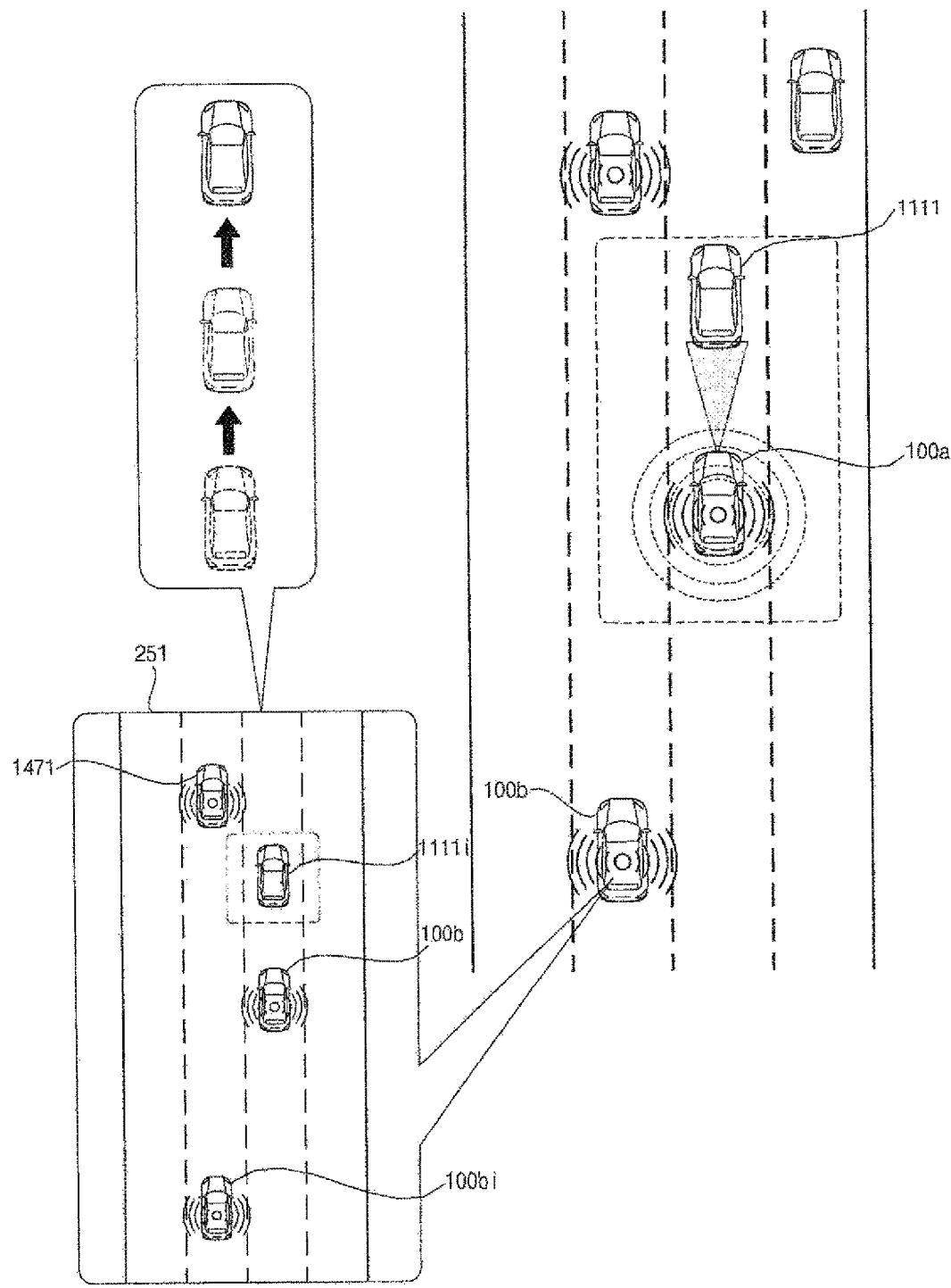
Figure 15:
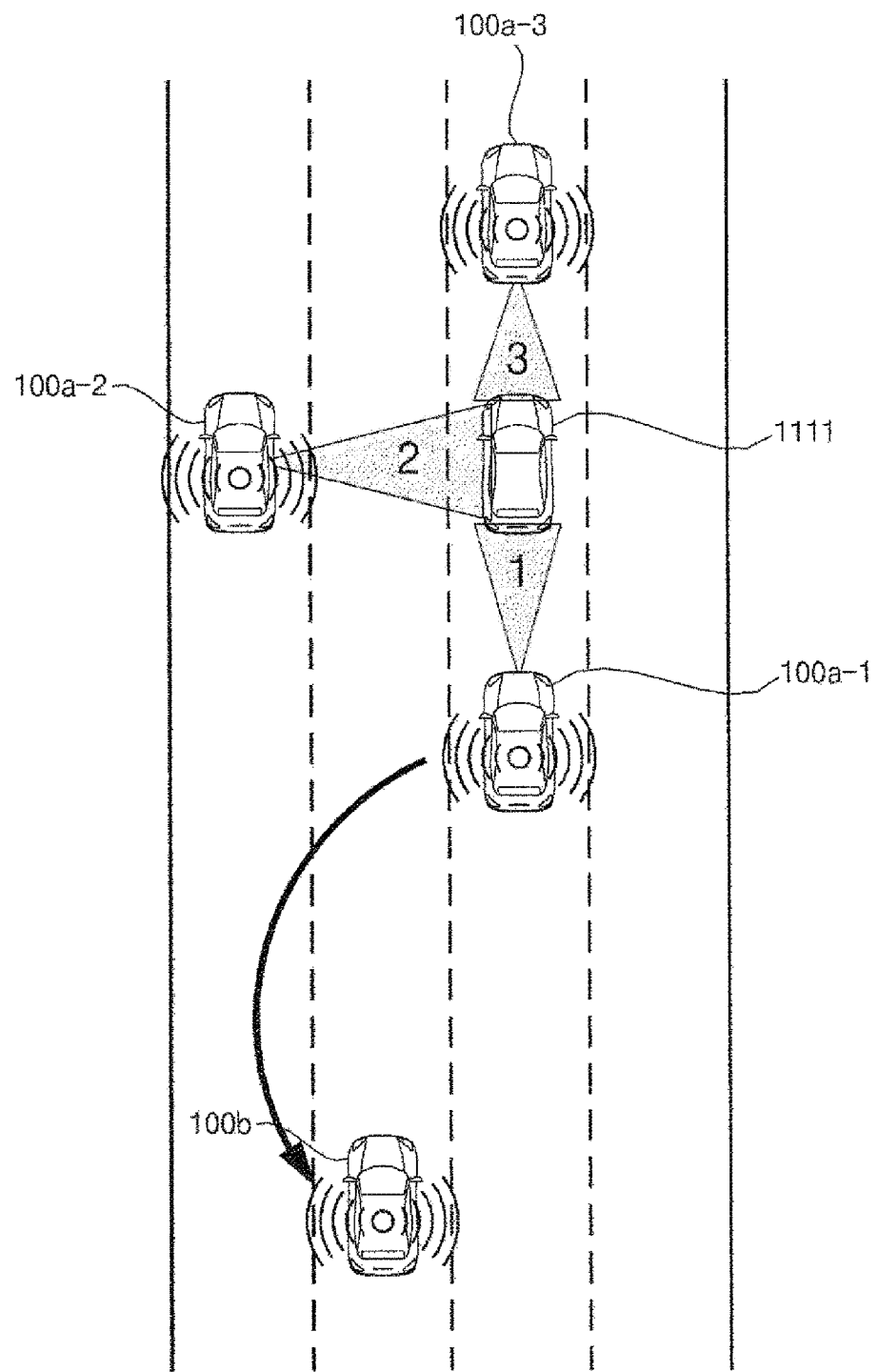
FIG. 15 is a diagram referred to in the description of determining reliability according to an embodiment of the present invention.

FIGS. 14A to 15 are for explaining the information receiving vehicle 100b shown in FIG. 9.

FIGS. 14A to 14H are diagrams referred to in the description of receiving and displaying recognition information for the first other vehicle according to an embodiment of the present invention.

Referring to FIG. 14A, the communication apparatus 400 of a second other vehicle 100b may receive recognition information for first other vehicle.

The communication apparatus 400 may confirm the presence of the first other vehicle 1111, a position of the first other vehicle 1111, a speed of the first other vehicle 1111, a lane occupied by the first other vehicle 1111, and a direction of the first other vehicle 1111 based on the recognition information for the first other vehicle.

Meanwhile, the vehicle 100a may generate the recognition information for the first other vehicle 1111 with ID information included therein.

Based on the ID information, the second other vehicle 100b may determine that the received recognition information is the recognition information for the first other vehicle 1111.

FIGS. 14B to 14E are diagrams referred to in the description of a second other vehicle determining a position of a first other vehicle according to an embodiment of the present invention.

As shown in FIG. 14B, the second other vehicle 100b may receive recognition information for a first other vehicle 1111 from a plurality of vehicles 100a.

The plurality of vehicles 100a may be distinguished into A vehicle 100a-1 and B vehicle 100a-2.

The second other vehicle 100b may receive recognition information for the first other vehicle 1111 from the A vehicle 100a-1.

The second other vehicle 100b may receive recognition information for the first other vehicle 1111 from B vehicle 100a-2.

Meanwhile, based on ID information or license plate information, the second other vehicle 100b may determine that recognition information for a vehicle incapable of performing vehicle-to-vehicle communication received from the A vehicle 100a-1 and recognition information received a vehicle incapable of performing vehicle-to-vehicle communication received from the B vehicle 100a-2 are recognition information for the first other vehicle 1111.

As shown in FIG. 14C, when recognition information for the first other vehicle 1111 is received from the A vehicle 100a-1 in a second time period t1-t2, the second other vehicle 100b may determine a position of the first other vehicle 1111 based on the recognition information for the first other vehicle 1111 being received in the second time period t1-t2.

As shown in FIG. 14D, when recognition information for the first other vehicle 1111 is received from the B vehicle 100a-2 in a third time period t2-t3, the second other vehicle 100b may determine a position of the first other vehicle 1111 based on the recognition information for the first other vehicle 1111 being received in the third time period t2-t3.

As shown in FIG. 14E, when recognition information for the first other vehicle 1111 is received from the A vehicle 100a-1 in a fourth time period t3-t4, the second other vehicle 100b may determine a position of the first other vehicle 1111 based on the recognition information for the first other vehicle 1111 being received in the fourth time period t3-t4.

FIGS. 14F and 14G are diagram referred to in the description of determining a position of the first other vehicle 1111 by the second other vehicle based on recognition information for the first other vehicle 1111 being received from a plurality of other vehicles according to an embodiment of the present invention.

Referring to the drawing, a second other vehicle 100b may generate recognition information for a first other vehicle 1111.

The second other vehicle 100b may receive first recognition information for the first other vehicle 1111 from the A vehicle 100a-1.

The second other vehicle 100b may receive second recognition information for the first other vehicle 1111 from the B vehicle 100a-2.

Meanwhile, based on ID information or license plate information, the second other vehicle 100b may determine that recognition information for a vehicle incapable of performing vehicle-to-vehicle communication generated by the second other vehicle 100b, recognition information for a vehicle incapable of performing vehicle-to-vehicle communication received from the A vehicle 100a-1, and recognition information for a vehicle incapable of performing vehicle-to-vehicle communication received from the B vehicle 100a-2 are recognition information for the first other vehicle 1111.

The user interface apparatus 300 of the second other vehicle 100b may generate a graphic image corresponding to the first other vehicle 1111 based on the first recognition information and the second recognition information, and output the graphic image through the display unit 251.

The user interface apparatus 300 of the second other vehicle 100b may generate a first graphic image corresponding to the first other vehicle 1111 based on the first recognition information.

The user interface apparatus 300 of the second other vehicle 100b may generate a second graphic image corresponding to the first other vehicle 1111 based on the second recognition information.

The second other vehicle 100b may determine a first location 1111a of the first other vehicle based on recognition information for the first other vehicle 1111 generated by the second other vehicle 100b.

The second other vehicle 100b may determine a second location 1111b of the first other vehicle based on recognition information for the first other vehicle 1111 received from the A vehicle 100a-1.

The second other vehicle 100b may determine a third location 1111c of the first other vehicle based on recognition information for the first other vehicle 1111 received from the B vehicle 100a-2.

As shown in FIG. 14F, the second other vehicle 100b may set an ROI 1450 to the entire area of the first location 1111a, the second location 1111b, and the third location 1111c.

The user interface apparatus 300 of the second other vehicle 100b may display an ROI that is set to the entire area of the first graphic image and the second graphic image.

Alternatively, the user interface apparatus 300 of the second other vehicle 100b may display an ROI that is set to an area where the first graphic image and the second graphic image overlap each other.

As shown in FIG. 14H, the second other vehicle 100b may determine that a center 1460 in the entire area of the first location 1111a, the second location 1111b, and the third location 1111c as a position of the first other vehicle 1111.

FIG. 14H is a diagram referred to in the description of displaying information on a first other vehicle through a user interface apparatus of a second other vehicle according to an embodiment of the present invention.

Referring to the drawing, the user interface apparatus 300 of a second other vehicle 100b may generate a graphic image 1111i corresponding to a first other vehicle 1111 based on recognition information for the first other vehicle 1111 received from the vehicle 100a, and display the graphic image 1111i on a display unit 251.

The user interface apparatus 300 of the second other vehicle 100b may generate graphic images 1471 and 1472 corresponding to vehicles capable of performing vehicle-to-vehicle communication, based on recognition information for such vehicles, and display the graphic images 1471 and 1472 on the display unit 251.

The user interface apparatus 300 of the second other vehicle 100b may generate a graphic image 100bi corresponding to the second other vehicle 100b based on location information of the second other vehicle 100b, and display the graphic image 100bi on the display unit 251.

The user interface apparatus 300 of the second other vehicle 100b may determine color, transparency, or size of a graphic image based on reliability of recognition information for the first other vehicle.

Here, the reliability of the recognition information for the first other vehicle may be determined in proportion to the number of other vehicles transmitting recognition information for the first other vehicle.

Here, the reliability of the recognition information for the first other vehicle may be determined based on communication strength between the vehicle 100a and the second other vehicle 100b.

Here, the reliability of the recognition information for the first other vehicle may be determined based on communication reliability between the vehicle 100a and the second other vehicle 100b.

FIG. 15 is a diagram referred to in the description of determining reliability according to an embodiment of the present invention.

A second other vehicle 100b may receive recognition information for a first other vehicle 1111 from a plurality of vehicles 100a-1, 100a-2, and 100a-3.

The recognition information for the first other vehicle 1111 may include information on a type of a sensor sensing the first other vehicle 1111, and information on a position where the sensor is attached.

A vehicle 100a-1 may sense the first other vehicle 1111 using a sensor attached to the front thereof. The A vehicle 100a-1 may generate first recognition information for the first other vehicle 1111 based on sensing information regarding the first other vehicle 1111.

B vehicle 100a-2 may sense the first other vehicle 1111 using a sensor attached on the right side thereof. The B vehicle 100a-2 may generate second recognition information for the first other vehicle 1111 based on sensing information regarding the first other vehicle 1111.

Vehicle C 100a-3 may sense the first other vehicle 1111 using a sensor attached to the rear thereof. Vehicle C 100a-3 may generate third recognition information for the first other vehicle 1111 based on sensing information regarding the first other vehicle 1111.

The second other vehicle 100b may receive the first recognition information, the second recognition information, and the third recognition information.

The second other vehicle 100b may determine reliability of the first to third recognition information based on information on a type of a sensor sensing the first other vehicle 1111.

For example, the second other vehicle 100b may determine reliability of the first to third recognition information based on precision in calculation of a distance between a sensor and an object. For example, reliability of the first to third recognition information are determined in order of a radar, a camera, and an ultrasonic sensor.

The second other vehicle 100b may determine reliability of the first to third recognition information based on information on a position where a sensor sensing the first other vehicle 1111 is attached.

For example, reliability of the first to third recognition information may be determined in order of a sensor attached on the front, a sensor attached on the side, and a sensor attached on the rear.

Figure 16A:
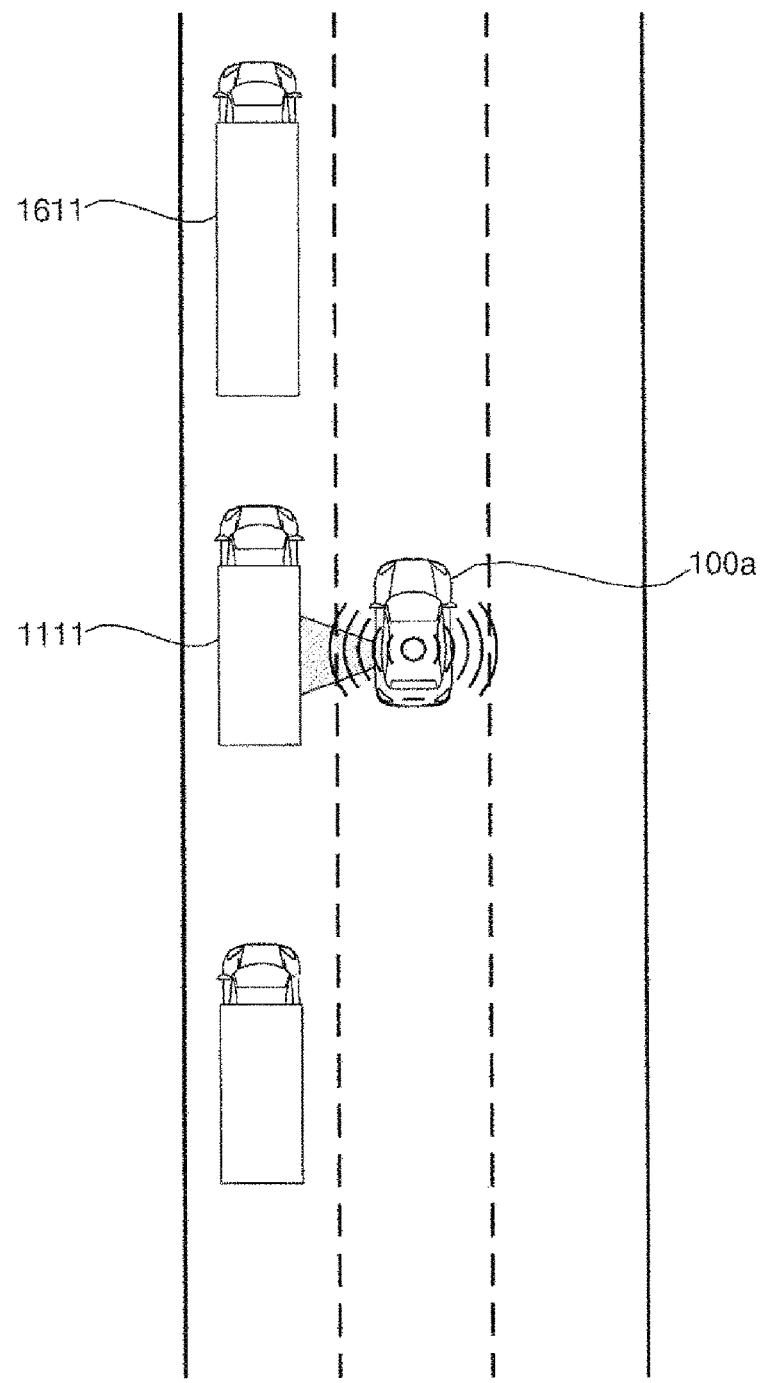
FIGS. 16A to 16C are diagrams referred to in the description of controlling not to transmit recognition information of a first other vehicle according to an embodiment of the present invention.
Figure 16B:
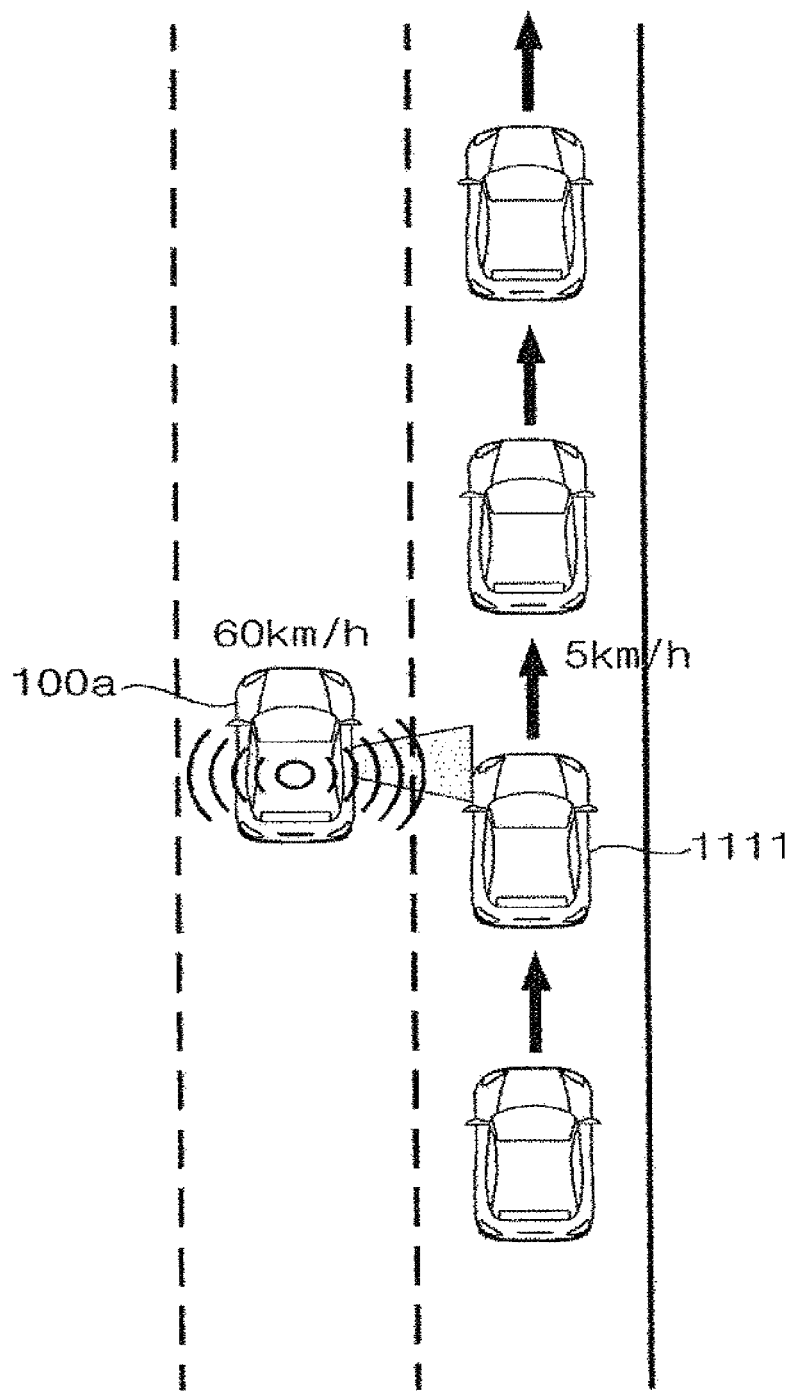
Figure 16C:
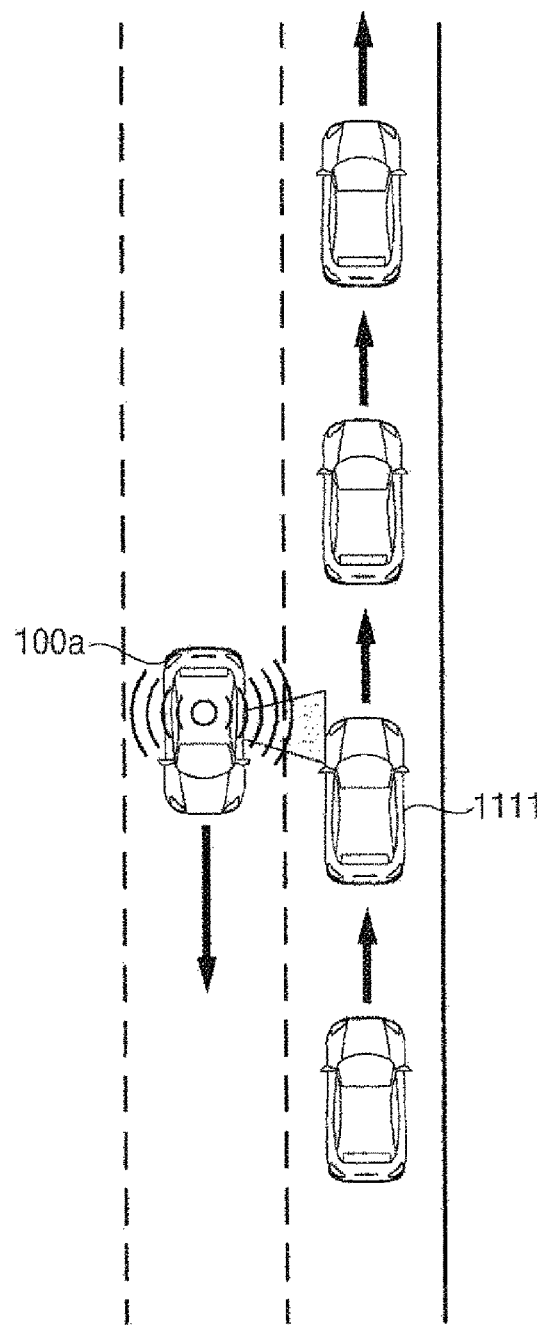

FIGS. 16A to 16C are diagrams referred to in the description of controlling not to transmit recognition information of a first other vehicle according to an embodiment of the present invention.

Referring to the drawings, the processor 470 may receive situation information of a first other vehicle from the object detection apparatus 300 through the interface unit 480.

The processor 470 may control the transmitter 432 not to transmit recognition information for the first other vehicle, based on the situation information of the first other vehicle.

The processor 470 may not generate recognition information for the first other vehicle based on the situation information for the first other vehicle.

The situation information of the first other vehicle may include first situation information, second situation information, and third situation information.

As shown in FIG. 16A, the first situation information may be situation information indicating that the first other vehicle 1111 is travelling in a dedicated lane 1611.

The processor 470 may include the first situation information from the object detection apparatus 300 through the interface unit 480. The processor 470 may control the transmitter 432 not to transmit recognition information for the first other vehicle 1111, based on the first situation information.

As shown in FIG. 16B, the second situation information may be information on a situation where a difference in speed between the first other vehicle 1111 and the vehicle 100 is equal to or greater than a reference value.

The processor 470 may receive the second situation information from the object detection apparatus 300 through the interface unit 480. The processor 470 may control the transmitter 432 not to transmit recognition information for the first other vehicle 1111, based on the second situation information.

As shown in FIG. 16C, the third situation information may be situation information indicating that a direction of travel of the first other vehicle 1111 may be different from a direction of travel of a vehicle 100a.

The processor 470 may receive the third situation information from the object detection apparatus 300 through the interface unit 480. The processor 470 may control the transmitter 432 not to transmit recognition information for the first other vehicle 1111, based on the third situation information.

FIGS. 18A to 18F are diagrams referred to in the description of operation of a vehicle communication system according to an embodiment of the present invention.

The vehicle communication system may include a vehicle 100a, a second vehicle 100b, and a Road Side Unit (RSU) 1810.

In the following description, a communication apparatus 400 of a vehicle 100 is assumed to include one transceiver antenna. The communication apparatus 400 may be referred to as an On Board Unit (OBU).

Figure 18A:
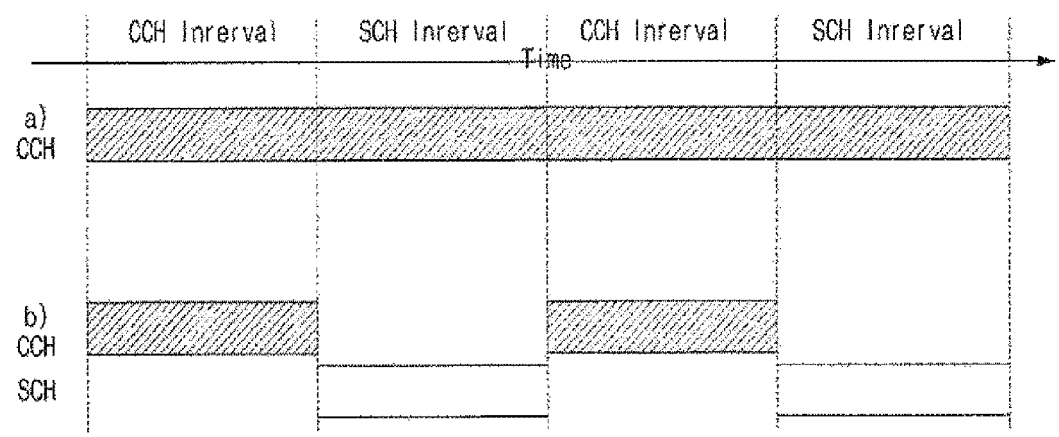
FIG. 18A to 18F are diagrams referred to in the description of a vehicle communication system according to an embodiment of the present invention.

Referring to FIG. 18A, the communication apparatus 400 may transmit and receive information, signals, or data via two communication channels at the same time.

The communication apparatus 400 may transmit and receive information, signals, or data by hopping the two communication channels at predetermined time intervals.

Figure 18B:
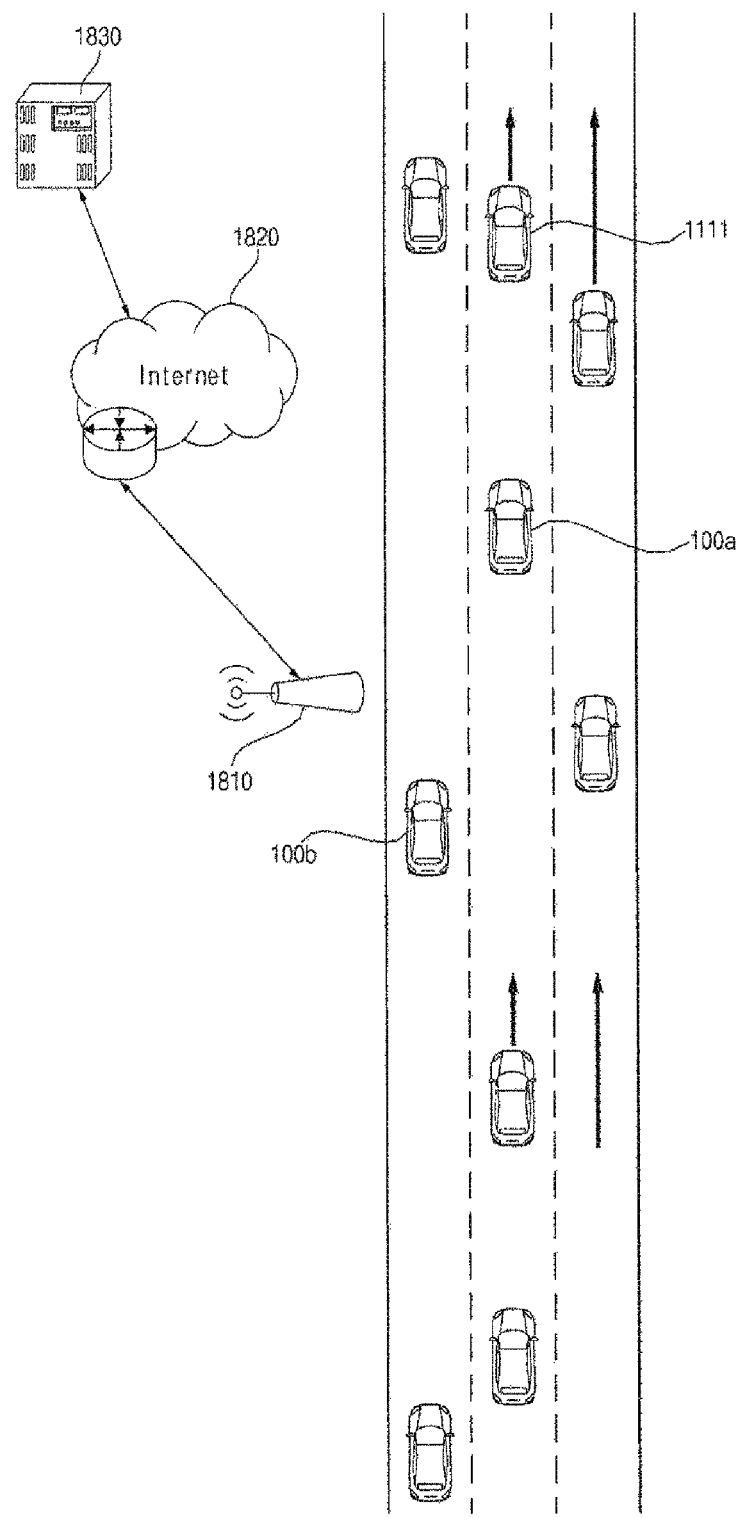

Referring to FIG. 18B, an information receiving vehicle 100b may bypass the RSU 1810 during traveling and thereby receive information, signals, or data from an external server 1830. In this case, the information receiving vehicle 100b may access the external server 1830 via a predetermined network 1820. In this case, the information receiving vehicle 100b may utilize a first communication channel.

An information generating vehicle 100a may generate recognition information for the first other vehicle 1111, and transmit the recognition information to the information receiving vehicle 100b. In this case, the information generating vehicle 100a may utilize a second communication channel.

Since the information receiving vehicle 100b is in communication with the external server 1830 via the first communication channel, the information receiving vehicle 100b is not able to receive the recognition information for the first other vehicle 1111 transmitted via the second communication channel.

Figure 18C:
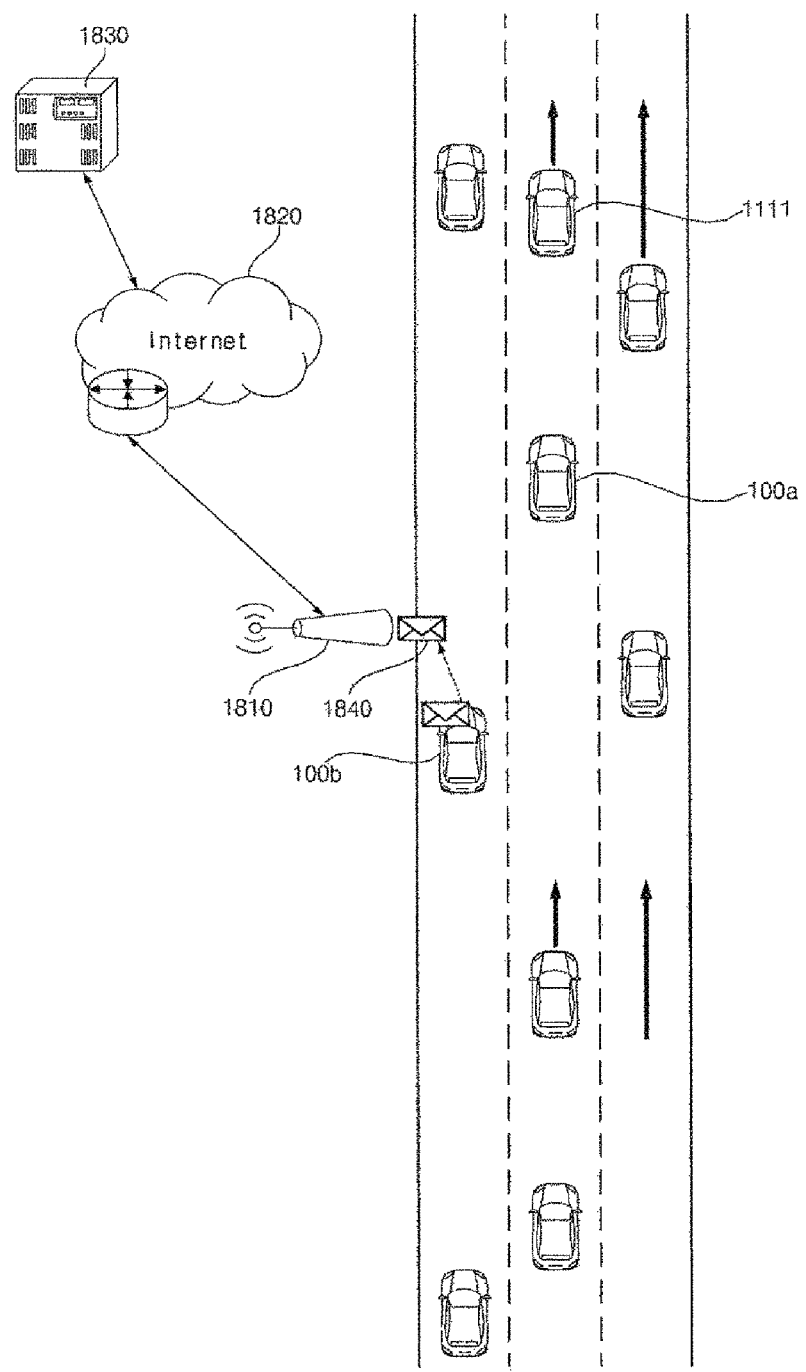

Referring to FIG. 18C, when the information receiving vehicle 100b wishes to receive the recognition information while in communication with the external server 1830, the information receiving vehicle 100b may transmit a request message 1840 to the RSU 1810.

Figure 18D:
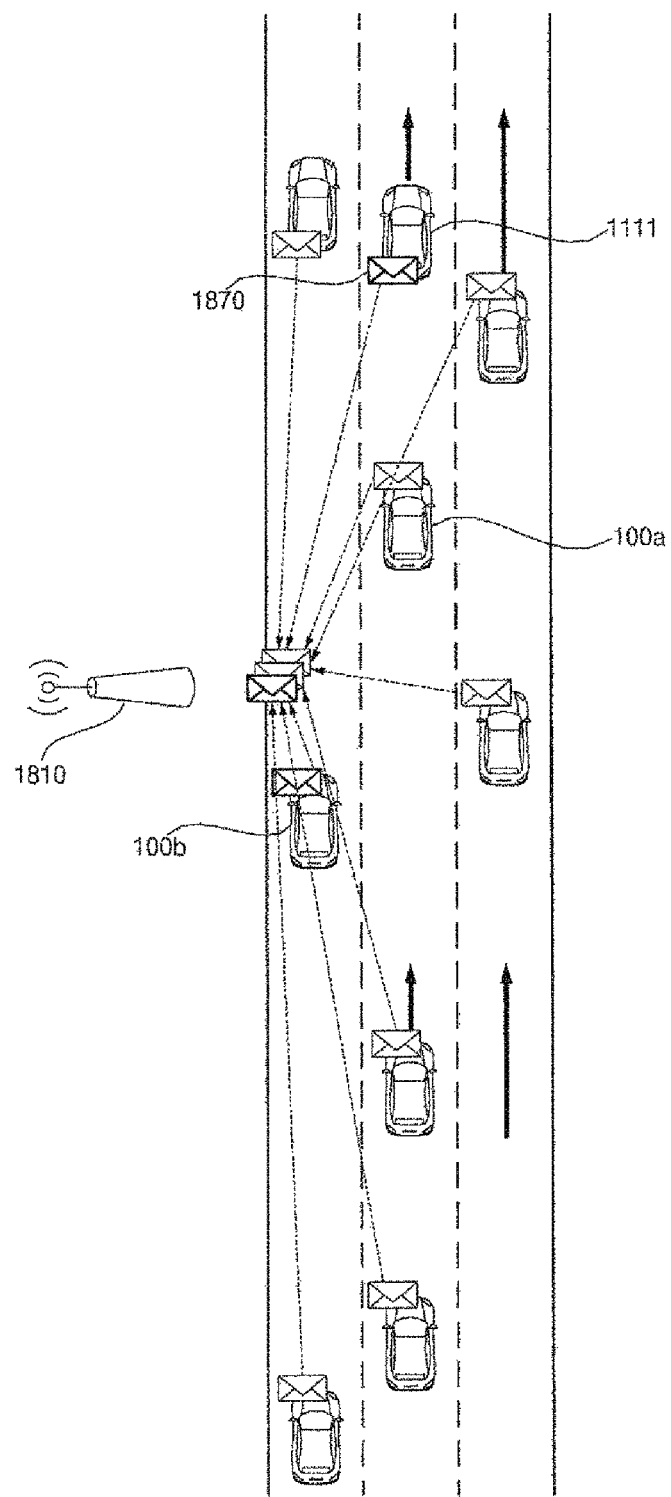

Referring to FIG. 18D, the RSU 1810 may include two or more antennas and utilize two or more channels.

The RSU 1810 may receive the recognition information for the first other vehicle 1111 from the information generating vehicle 100a via the second communication channel.

The RSU 1810 may shift the second communication channel to the first communication channel to be used by the recognition information for the first other vehicle 1111.

The RSU 1810 may transmit the recognition information for the first other vehicle 1111 to the information receiving vehicle 100b via the first communication channel.

In this case, the information receiving vehicle 100b may receive the recognition information for the first other vehicle 1111 while keeping in communication with the external server 1830 via the first communication channel.

Figure 18E:
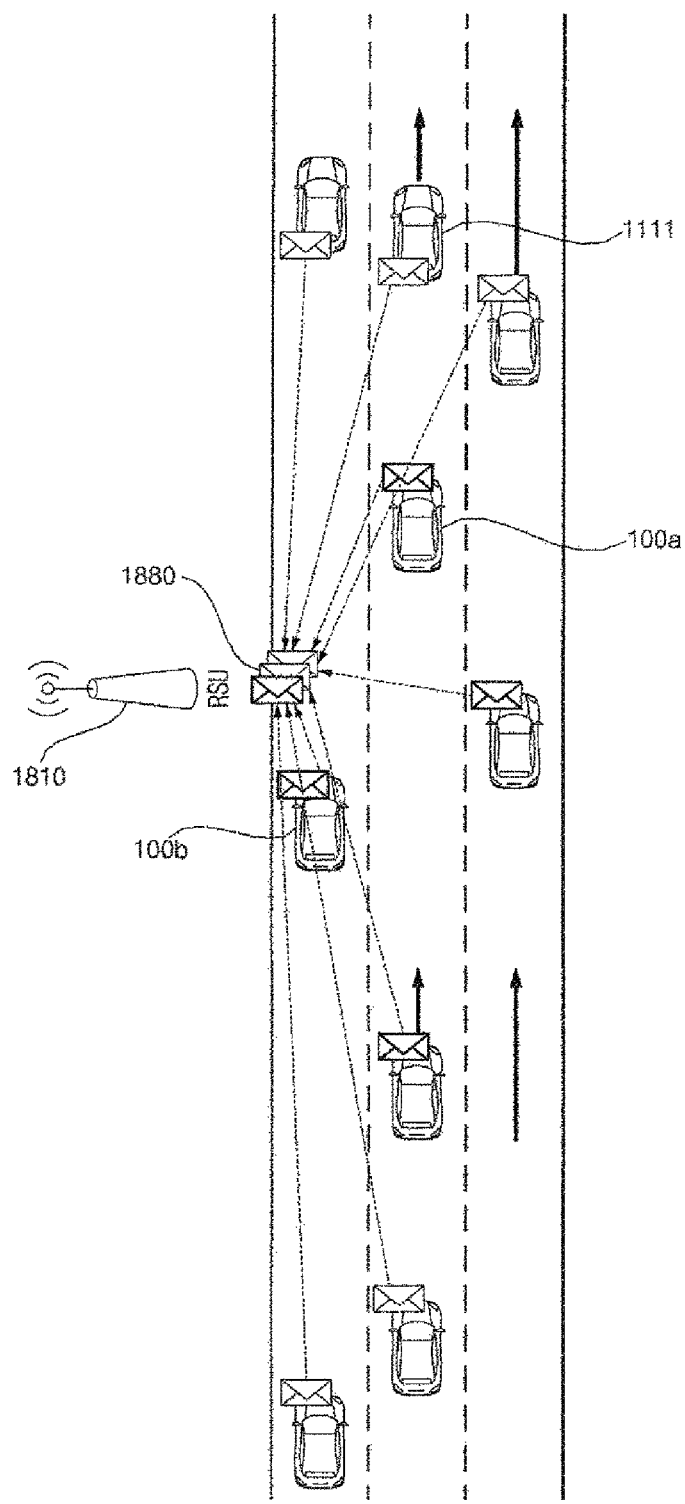

Referring to FIG. 18E, the information receiving vehicle 100b may transmit recognition information for itself to the RSU 1810 via the first communication channel.

In this case, the RSU 1810 may transmit recognition information 1880 for the information receiving vehicle 100b to other nearby vehicles 100c via the first communication channel or the second communication channel.

Here, the other nearby vehicles 100c may be other vehicles 100c located in a predetermined distance from the information receiving vehicle 100b.

Figure 18F:
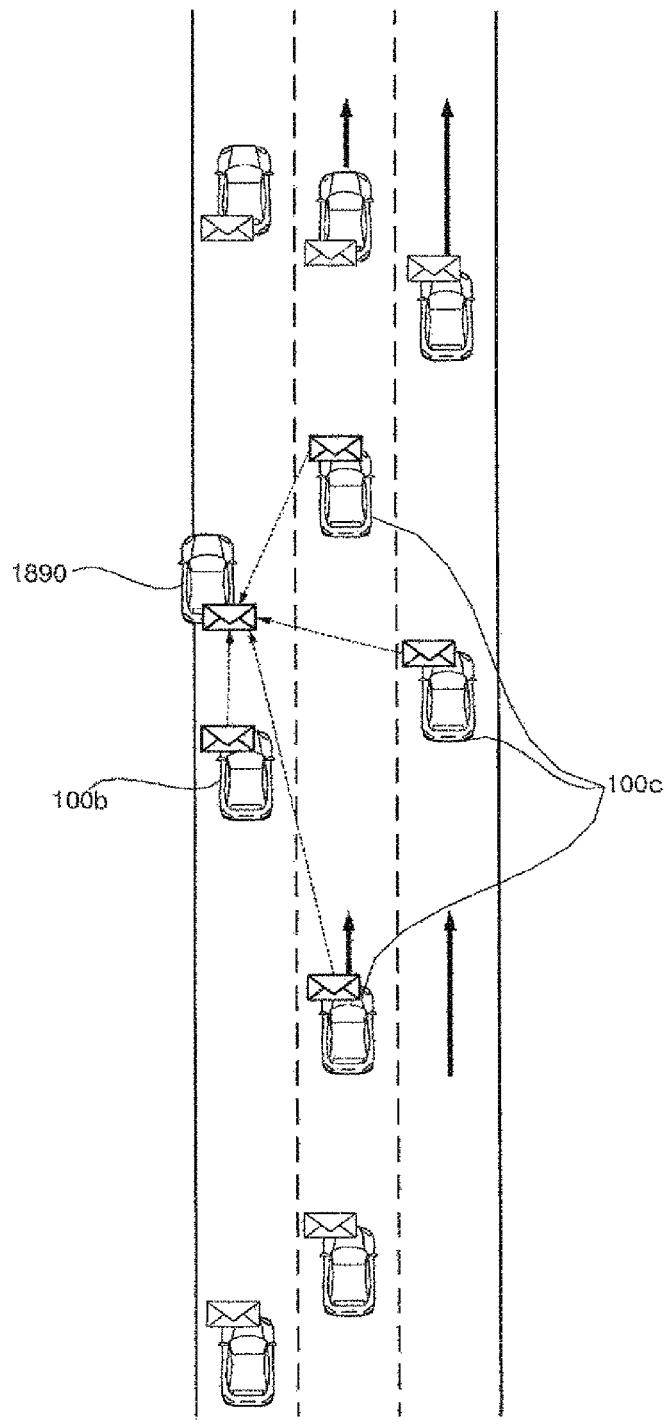

Referring to FIG. 18F, the vehicle communication system may further include an information relay vehicle 1890.

Here, the information relay vehicle 1890 may play a role of the aforementioned RSU 1810.

The information relay vehicle 1890 may include two or more antennas and utilize two or more channels.

The information relay vehicle 1890 may receive recognition information for the first other vehicle 1111 from the information generating vehicle 100a via the second communication channel.

The information relay vehicle 1890 may shift the second communication channel to the first communication channel to be used by the recognition information for the first other vehicle 1111.

The information relay vehicle 1890 may transmit the recognition information for the first other vehicle 1111 to the information receiving vehicle 100b via the first communication channel.

In this case, the information receiving vehicle 100b may receive the recognition information for the first other vehicle 1111 while in communication with the external server 1830 via the first communication channel.

The information receiving vehicle 100b may transmit recognition information for itself to the information relay vehicle 1890 via the first communication channel.

In this case, the information relay vehicle 1890 may transmit recognition information 1880 for the information receiving vehicle 100b to other nearby vehicles 100c via the first communication channel or the second communication channel.

Here, the other nearby vehicle 100c may be other vehicles 100c located in a predetermined distance from the information receiving vehicle 100b.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may a processor or a controller. The foregoing description is merely exemplary and are not to be considered as limiting the present disclosure. The scope of the invention should be determined by reasonable interpretation of the appended claims and all changes that come within the equivalent scope of the invention are included in the scope of the invention.

The invention claimed is:

1. A communication apparatus for a vehicle, comprising:
   an interface unit configured to receive sensing information regarding a first other vehicle located in a vicinity of the vehicle and incapable of performing vehicle-to-vehicle communication;
   a transmitter configured to transmit information to a second other vehicle capable of performing vehicle-to-vehicle communication; and
   a processor configured to generate recognition information for the first other vehicle based on the sensing information, and transmit the recognition information for the first other vehicle to the second other vehicle through the transmitter;
   wherein the processor is further configured to: receive situation information of the first other vehicle through the interface unit; and based on the situation information of the first other vehicle, control the transmitter not to transmit the recognition information for the first other vehicle; and
   wherein the processor is further configured to: receive first situation information indicating that the first other vehicle is travelling in a dedicated lane; and based on the first situation information, control the transmitter not to transmit the recognition information for the first other vehicle.

2. The communication apparatus of claim 1, wherein the processor is further configured to:
   receive information on a relative distance between the vehicle and the first other vehicle and information on a relative speed between the vehicle and the first other vehicle through the interface unit; and
   generate the recognition information for the first other vehicle based on the information on the relative distance and the information on the relative speed.

3. The communication apparatus of claim 2, wherein the processor is further configured to:
   receive location information of the vehicle through the interface unit; and
   generate the recognition information for the first other vehicle further based on the location information.

4. The communication apparatus of claim 1, wherein the processor is further configured to transmit recognition information for the vehicle to the second other vehicle, along with the recognition information for the first other vehicle.

5. The communication apparatus of claim 4, wherein the processor is further configured to alternately transmit the recognition information for the first other vehicle and the recognition information for the vehicle to the second other vehicle.

6. The communication apparatus of claim 1, wherein the processor is further configured to generate the recognition information for the first other vehicle in a Basic Safety Message (BSM) format or a Contextual Awareness Message (CAM) format.

7. The communication apparatus of claim 1, further comprising a receiver configured to receive recognition information for at least one other vehicle capable of performing vehicle-to-vehicle communication,
   wherein the processor is further configured to determine that the first other vehicle is a vehicle incapable of performing vehicle-to-vehicle communication, by comparing the recognition information for the at least one other vehicle and the sensing information regarding the first other vehicle.

8. The communication apparatus of claim 7, wherein the processor is further configured to, when the first other vehicle is located in front of the vehicle, generate the recognition information for the first other vehicle.

9. The communication apparatus of claim 7, wherein the processor is further configured to: through the interface unit,
   receive first sensing information for a first-a other vehicle positioned at a first location with reference to the vehicle and incapable of performing vehicle-to-vehicle communication;
   receive second sensing information for a first-b other vehicle positioned at a second location with reference to the vehicle and incapable of performing vehicle-to-vehicle communication;
   generate and transmit recognition information for the first-a other vehicle based on the first sensing information in a first time period; and
   generate and transmit recognition information for the first-b other vehicle based on the second sensing information in a second time period,
   wherein the first time period and the second time period are in sync with the at least one other vehicle.

10. The communication apparatus of claim 7, wherein the processor is further configured to:
    receive license plate information of the first other vehicle through the interface unit; and
    generate the recognition information for the first other vehicle with the license plate information included therein.

11. The communication apparatus of claim 1, wherein the processor is further configured to: receive second situation information indicating that a difference in speed between the first other vehicle and the vehicle is equal to or greater than a reference value; and based on the second situation information, control the transmitter not to transmit the recognition information for the first other vehicle.

12. The communication apparatus of claim 1, wherein the processor is further configured to: receive third situation information indicating that a direction of travel of the first other vehicle is different from a direction of travel of the vehicle; and based on the third situation information, control the transmitter not to transmit the recognition information for the first other vehicle.

13. A vehicle comprising:
    a communication apparatus, wherein the communication apparatus comprises a receiver configured to receive information from a plurality of other vehicles, and a processor configured to receive, through the receiver, recognition information for a first other vehicle incapable of performing vehicle-to-vehicle communication;
    a transmitter configured to transmit information to a second other vehicle capable of performing vehicle-to-vehicle communication;
    a user interface apparatus configured to, based on the recognition information for the first other vehicle, output a graphic image corresponding to the first other vehicle;
    wherein the processor is configured to: receive situation information of the first other vehicle through the user interface; and based on the situation information of the first other vehicle, control the transmitter not to transmit the recognition information for the first other vehicle; and
    wherein the processor is further configured to: receive first situation information indicating that the first other vehicle is travelling in a dedicated lane; and based on the first situation information, control the transmitter not to transmit the recognition information for the first other vehicle.

14. The vehicle of claim 13,
wherein the processor is further configured to:
    receive first recognition information for the first other vehicle from A other vehicle through the receiver; and
    receive second recognition information for the first other vehicle from B other vehicle through the receiver, and
wherein the user interface apparatus is further configured to generate the graphic image based on a combination of the first recognition information and the second recognition information.

15. The vehicle of claim 14,
wherein the first recognition information comprises first location information and first speed information for the first other vehicle generated by the A other vehicle, and
wherein the second recognition information comprises second location information and second speed information for the first other vehicle generated by the B other vehicle.

16. The vehicle of claim 14,
wherein the user interface apparatus is further configured to:
    generate a first graphic image corresponding to the first other vehicle based on the first recognition information; and
    generate a second graphic image corresponding to the first other vehicle based on the second recognition information, and
wherein a Region of Interest (ROI) set to an entire area of the first graphic image and the second graphic image is displayed.

17. The vehicle of claim 14,
wherein the user interface apparatus is further configured to:
    generate a first graphic image corresponding to the first other vehicle based on the first recognition information; and
    generate a second graphic image corresponding to the first other vehicle based on the second recognition information, and
wherein an ROI set to an area where the first graphic image and the second graphic image overlap each other is displayed.

18. The vehicle of claim 13,
wherein the processor is further configured to determine reliability of the recognition information for the first other vehicle, based on a number of other vehicles transmitting recognition information for the first other vehicle, and
wherein the user interface apparatus is further configured to determine color, transparency, or size of the graphic image based on the reliability.

* * * * *